United States Patent
Kim

(10) Patent No.: US 11,119,503 B2
(45) Date of Patent: Sep. 14, 2021

(54) METHOD FOR CONTROLLING VEHICLE IN AUTONOMOUS DRIVING SYSTEM AND APPARATUS THEREOF

(71) Applicant: LG Electronics Inc., Seoul (KR)

(72) Inventor: Cheolseung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 170 days.

(21) Appl. No.: 16/573,520

(22) Filed: Sep. 17, 2019

(65) Prior Publication Data
US 2020/0012295 A1    Jan. 9, 2020

(30) Foreign Application Priority Data
Aug. 16, 2019 (KR) .......... 10-2019-0100370

(51) Int. Cl.
  *G05D 1/02* (2020.01)
  *G05D 1/00* (2006.01)
  *B60W 30/18* (2012.01)

(52) U.S. Cl.
  CPC .......... *G05D 1/0291* (2013.01); *B60W 30/18* (2013.01); *G05D 1/0088* (2013.01);
  (Continued)

(58) Field of Classification Search
  CPC ..... G05D 1/0287–0295; G05D 1/0088; G05D 2201/0213; B60W 30/18; B60W 30/10;
  (Continued)

(56) References Cited

U.S. PATENT DOCUMENTS

2016/0171894 A1* 6/2016 Harvey ............... G05D 1/0293
                                                                  701/23
2020/0233419 A1* 7/2020 McDuff .......... G08G 1/096725

FOREIGN PATENT DOCUMENTS

JP    2002205648    7/2002
JP    2008262414    10/2008
(Continued)

OTHER PUBLICATIONS

Korean Notice of Allowance in Korean Application No. 10-2019-0100370, dated Jul. 13, 2020, 3 pages 9with English translation).

*Primary Examiner* — Aaron L Troost
(74) *Attorney, Agent, or Firm* — Fish & Richardson P.C.

(57) ABSTRACT

Disclosed is a method and apparatus for controlling a vehicle in an autonomous driving system that controls platooning. A method of controlling a first vehicle that transports passengers in an autonomous driving system that controls platooning according to an embodiment of the present disclosure includes: receiving boarding/alighting information of the passengers from a server; determining a first platoon formation of platooning vehicles that travel in the same lane in a platoon on the basis of the boarding/alighting information; transmitting information about the first platoon formation to other vehicles included in the platoon; checking an object moving adjacent to the lane; and transmitting an object block instruction message, which changes the platoon formation into a second platoon formation such that a block distance between at least one vehicle included in the platoon and a sidewalk becomes smaller than a width of the object, to other vehicles included in the platoon.

20 Claims, 38 Drawing Sheets

(52) U.S. Cl.
CPC . *B60W 2554/00* (2020.02); *B60W 2554/4041* (2020.02); *B60W 2554/804* (2020.02); *B60W 2556/65* (2020.02); *G05D 2201/0213* (2013.01)

(58) Field of Classification Search
CPC ....... B60W 30/12; B60W 30/08–0956; B60W 2554/4041; B60W 2554/804; B60W 2554/00; B60W 2556/65; B60W 60/00; B60W 60/0015–0017
See application file for complete search history.

(56) References Cited

FOREIGN PATENT DOCUMENTS

| | | |
|---|---|---|
| JP | 5342556 | 11/2013 |
| JP | 6538812 | 7/2019 |
| KR | 101711549 | 3/2017 |
| KR | 1020190075221 | 7/2019 |

\* cited by examiner (a)　　　　　　　　　　(b)

Fig. 25
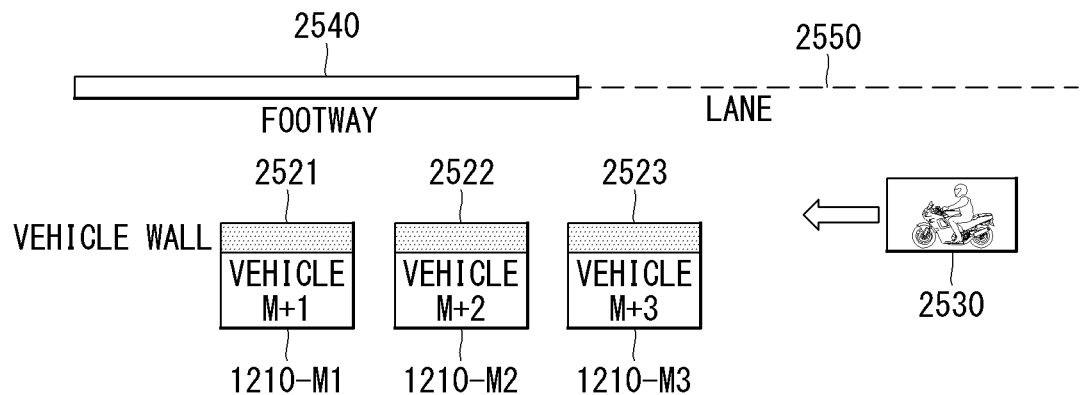
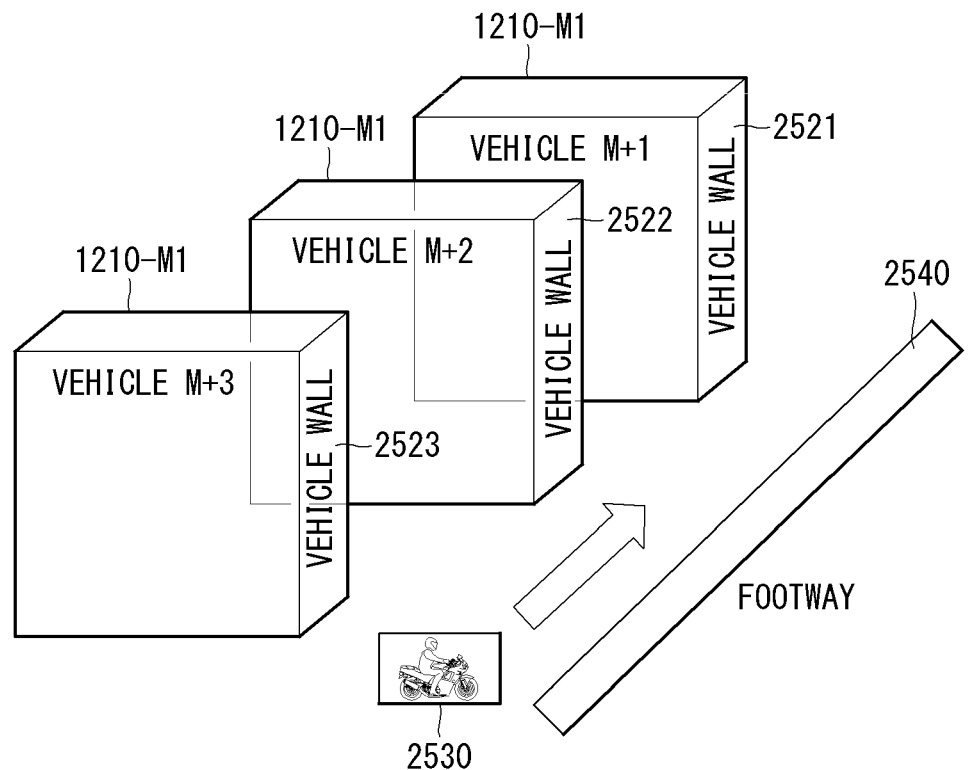

METHOD FOR CONTROLLING VEHICLE IN AUTONOMOUS DRIVING SYSTEM AND APPARATUS THEREOF

CROSS-REFERENCE TO RELATED APPLICATION

This application claims the benefit of Korea Patent Application No. 10-2019-0100370 filed on Aug. 16, 2019, which is incorporated herein by reference for all purposes as if fully set forth herein.

BACKGROUND OF THE INVENTION

Field of the Invention

The present disclosure relates to a method for controlling a vehicle in an autonomous driving system and an apparatus thereof and, more particularly, a method and apparatus for controlling a vehicle to secure safe boarding or alighting for passengers in an autonomous driving system that drives a plurality of vehicles in a platoon.

Related Art

Vehicles, in accordance with the prime mover that is used, can be classified into an internal combustion engine vehicle, an external combustion engine vehicle, a gas turbine vehicle, an electric vehicle or the like.

An autonomous vehicle refers to a vehicle that can be driven by itself without operation by a driver or a passenger and an autonomous driving system refers to a system that monitors and controls such an autonomous vehicle so that the autonomous vehicle can be driven by itself.

In an autonomous driving system, a plurality of vehicle can make a platoon and can be driven in the platoon formation while exchanging information to each other through V2X (vehicle-to-everything) communication. Further, a technology for preventing an object such as a motor cycle from colliding with a vehicle is required for vehicles that passengers frequently board on or alight from such as a bus.

SUMMARY OF THE INVENTION

An object of the present disclosure is to solve the necessities and/or problems described above.

Further, an object of the present disclosure is to provide a method and apparatus for controlling a vehicle in an autonomous driving system, the method and apparatus providing an environment in which passengers can safely board on or alight from the vehicle.

Further, an object of the present disclosure is to provide a method and apparatus for controlling a vehicle in an autonomous driving system, the method and apparatus being capable of detecting an object that is positioned around vehicles driven in a platoon and has a possibility of collision with a passenger.

A method of controlling a first vehicle that transports passengers in an autonomous driving system that controls platooning according to an embodiment of the present disclosure includes: receiving boarding/alighting information of the passengers from a server; determining a first platoon formation of platooning vehicles that travel in the same lane in a platoon on the basis of the boarding/alighting information; transmitting information about the first platoon formation to other vehicles included in the platoon; detecting an object moving adjacent to the lane; and transmitting an object block instruction message, which changes the platoon formation into a second platoon formation such that a block distance between at least one vehicle included in the platoon and a sidewalk becomes smaller than a width of the object, to other vehicles included in the platoon.

Further, the boarding/alighting information may include a stopping position, the number of passengers who board or alight at the stopping position, and an expected time required for boarding or alighting at the stopping position.

Further, the determining of a first platoon formation may include: checking an expected stop time of each of the vehicles included in a platoon at the stopping position; determining order with respect to positions of the vehicles included in the platoon on the basis of the expected stop time of each of the vehicles included in the platoon; and determining the first platoon formation on the basis of the order.

Further, the object corresponds to an object that has a predetermined size and can move, and the checking of an object may include: receiving first object movement information about movement of the object in a first area that is a surrounding area of a second vehicle from the second vehicle traveling behind the first vehicle; receiving second object movement information about movement of the object in a second area that is a surrounding area of a third vehicle from the third vehicle traveling behind the second vehicle; and checking continuous movement of the object in the first area and the second area on the basis of the first object movement information and the second object movement information.

A method of controlling a second vehicle that prevent intrusion of an object from a first vehicle that transports passengers in an autonomous driving system that controls platooning according to another embodiment of the present disclosure includes: receiving information about a first platoon formation of platoon vehicle traveling in a platoon in the same lane from a first vehicle; traveling in accordance with the first platoon formation; receiving movement information of an object moving adjacent to the lane from a third vehicle traveling behind the second vehicle in the platoon; receiving an object block instruction message, which changes the platoon formation into a second platoon formation such that a block distance between at least one vehicle included in the platoon and a sidewalk becomes smaller than a width of the object, from the first vehicle; and traveling in accordance with the second platoon formation.

A method of controlling a third vehicle that provides object sensing information to a first vehicle that transports passengers and a second vehicle that assists boarding/alighting of the passengers of the first vehicle in an autonomous driving system that controls platooning according to another embodiment of the present disclosure, includes: receiving information about a first platoon formation of platoon vehicle traveling in a platoon in the same lane from the first vehicle; traveling in accordance with the first platoon formation; detecting an object moving adjacent to the lane; transmitting movement information of the object to other vehicles included in the platoon; receiving an object block instruction message, which changes the platoon formation into a second platoon formation such that a block distance between at least one vehicle included in the platoon and a sidewalk becomes smaller than a width of the object, from the first vehicle; and traveling in accordance with the second platoon formation.

BRIEF DESCRIPTION OF THE DRAWINGS

The accompanying drawings, which are included herein as a part of the description for help understanding the present disclosure, provide embodiments of the present disclosure, and describe the technical features of the present disclosure with the description below.

FIG. 25 shows an example of detecting an object moving between a vehicle and a sidewalk in an autonomous driving system according to an embodiment of the present disclosure.

Accompanying drawings included as a part of the detailed description for helping understand the present disclosure provide embodiments of the present disclosure and are provided to describe technical features of the present disclosure with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
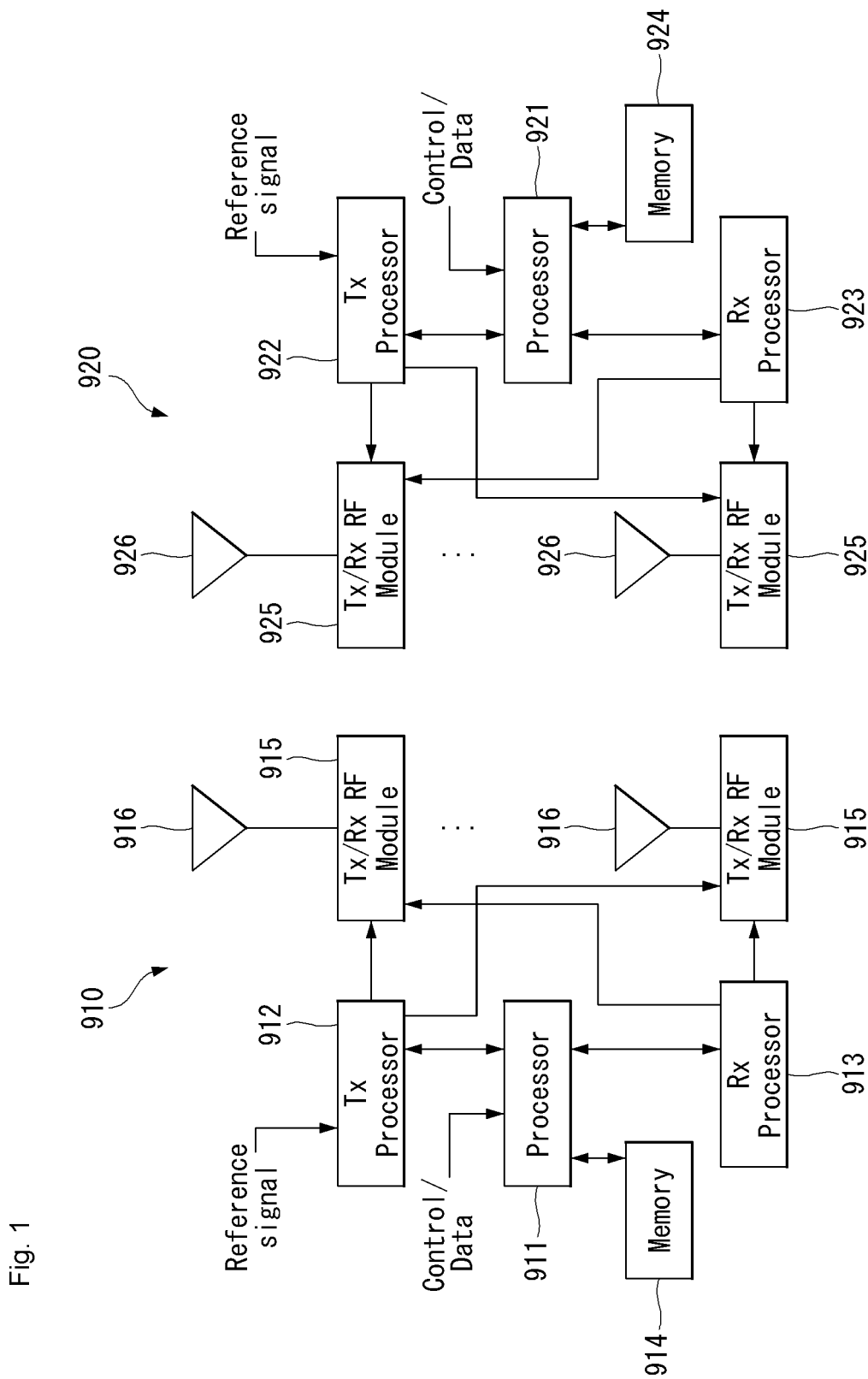
FIG. 1 shows an example of a block diagram of a wireless communication system to which methods proposed in the present disclosure can be applied.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
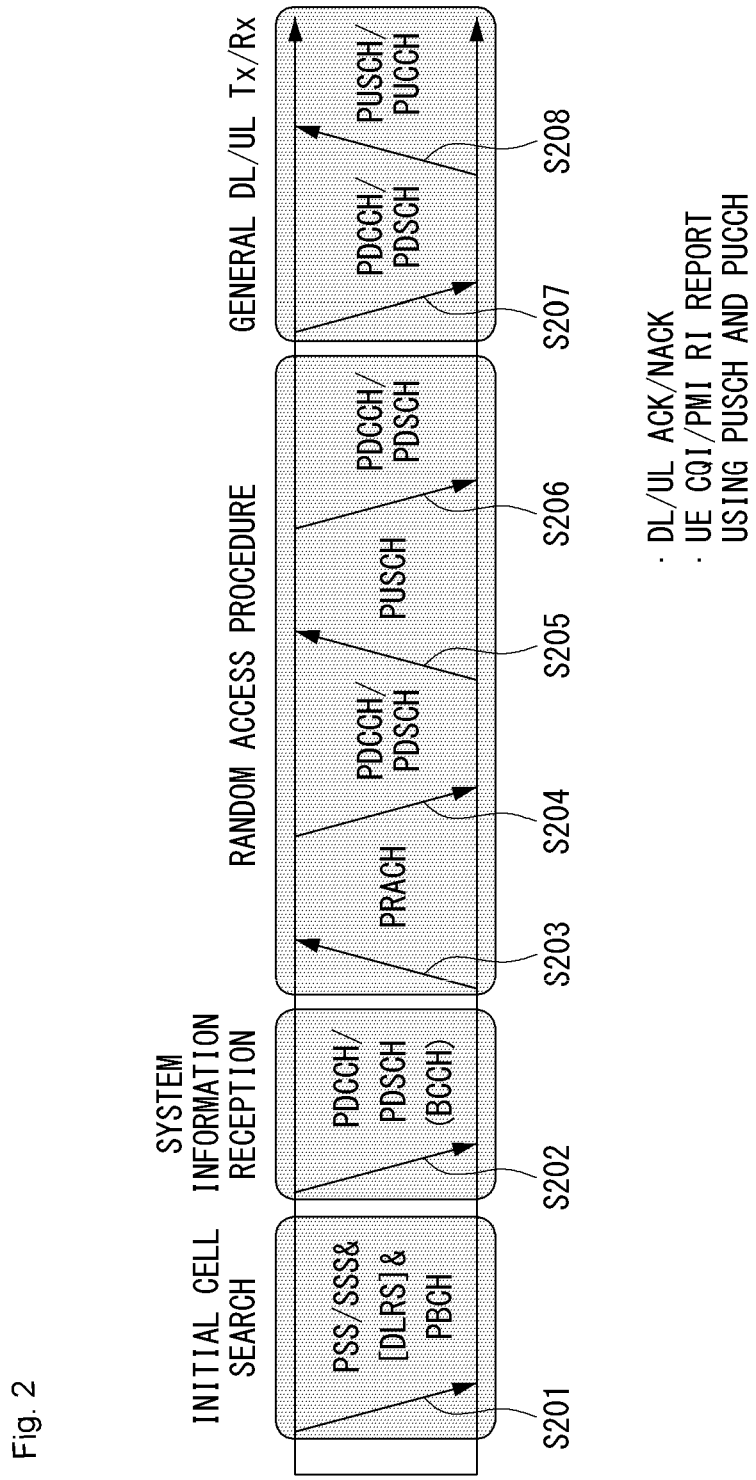
FIG. 2 shows an example of a method for transmitting and receiving signals in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2-1. The UE is additionally configured with a corresponding set of positions for fields in DCI format 2-1 according to a set of serving cells and positionInDCI by INT-ConfigurationPerServing Cell including a set of serving cell indexes provided by serving-CellID, configured having an information payload size for DCI format 2-1 according to dci-Payloadsize, and configured with indication granularity of time-frequency resources according to timeFrequencySect.

The UE receives DCI format 2-1 from the BS on the basis of the DownlinkPreemption IE.

When the UE detects DCI format 2-1 for a serving cell in a configured set of serving cells, the UE can assume that there is no transmission to the UE in PRBs and symbols indicated by the DCI format 2-1 in a set of PRBs and a set of symbols in a last monitoring period before a monitoring period to which the DCI format 2-1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation between Autonomous Vehicles Using 5G Communication

Figure 3:
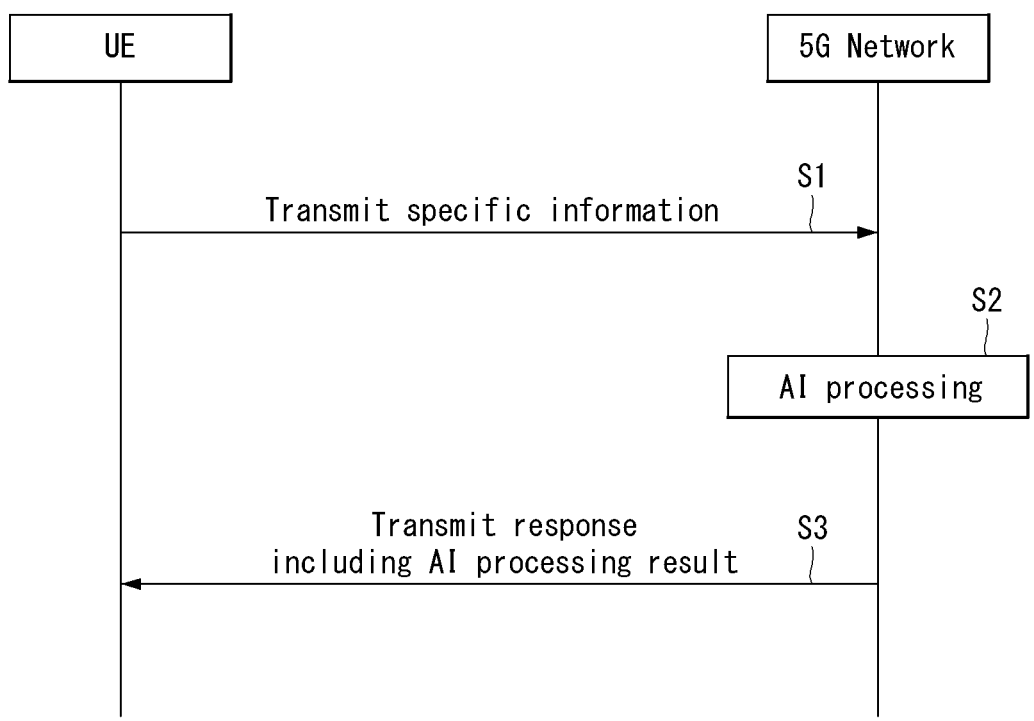
FIG. 3 shows an example of a basic operation between a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2-1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation between Vehicles using 5G Communication

Figure 4:
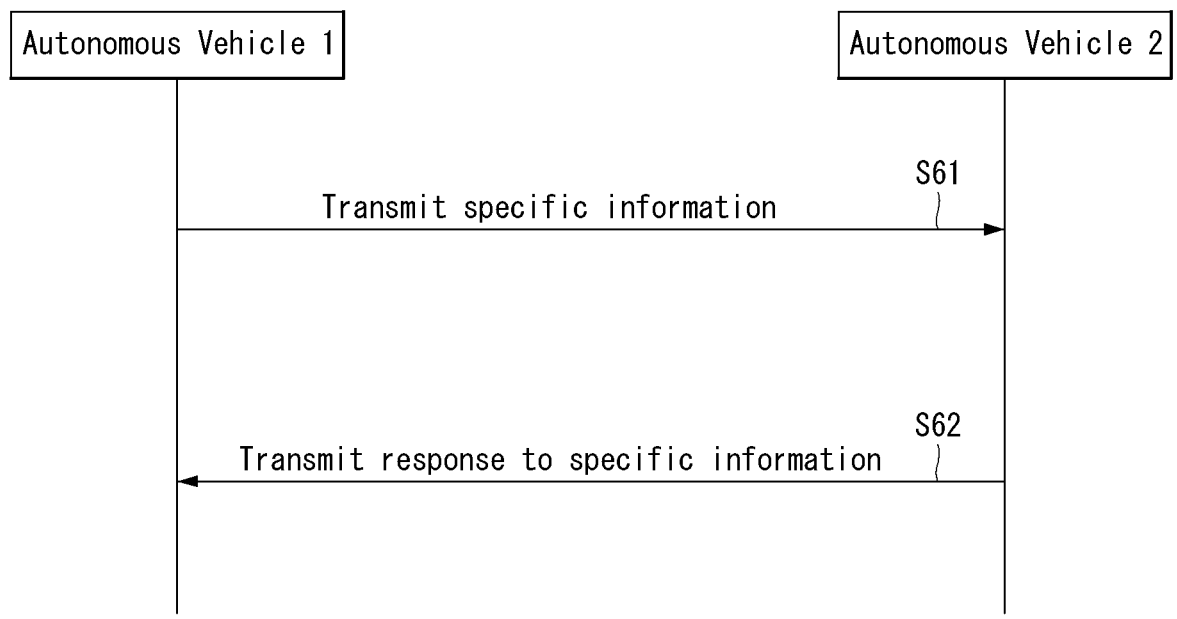
FIG. 4 shows an example of a basic operation between vehicles using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

Figure 5:
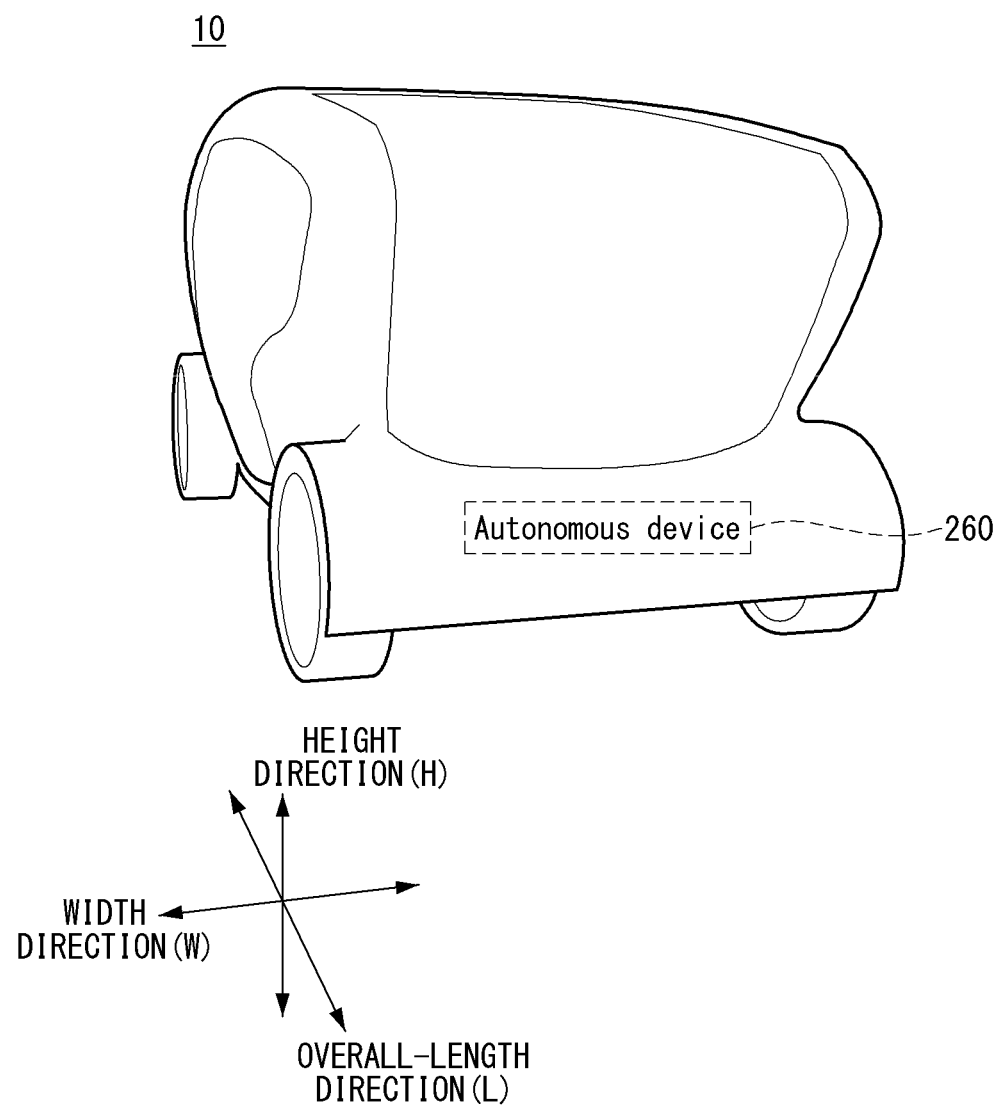
FIG. 5 is a diagram showing a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
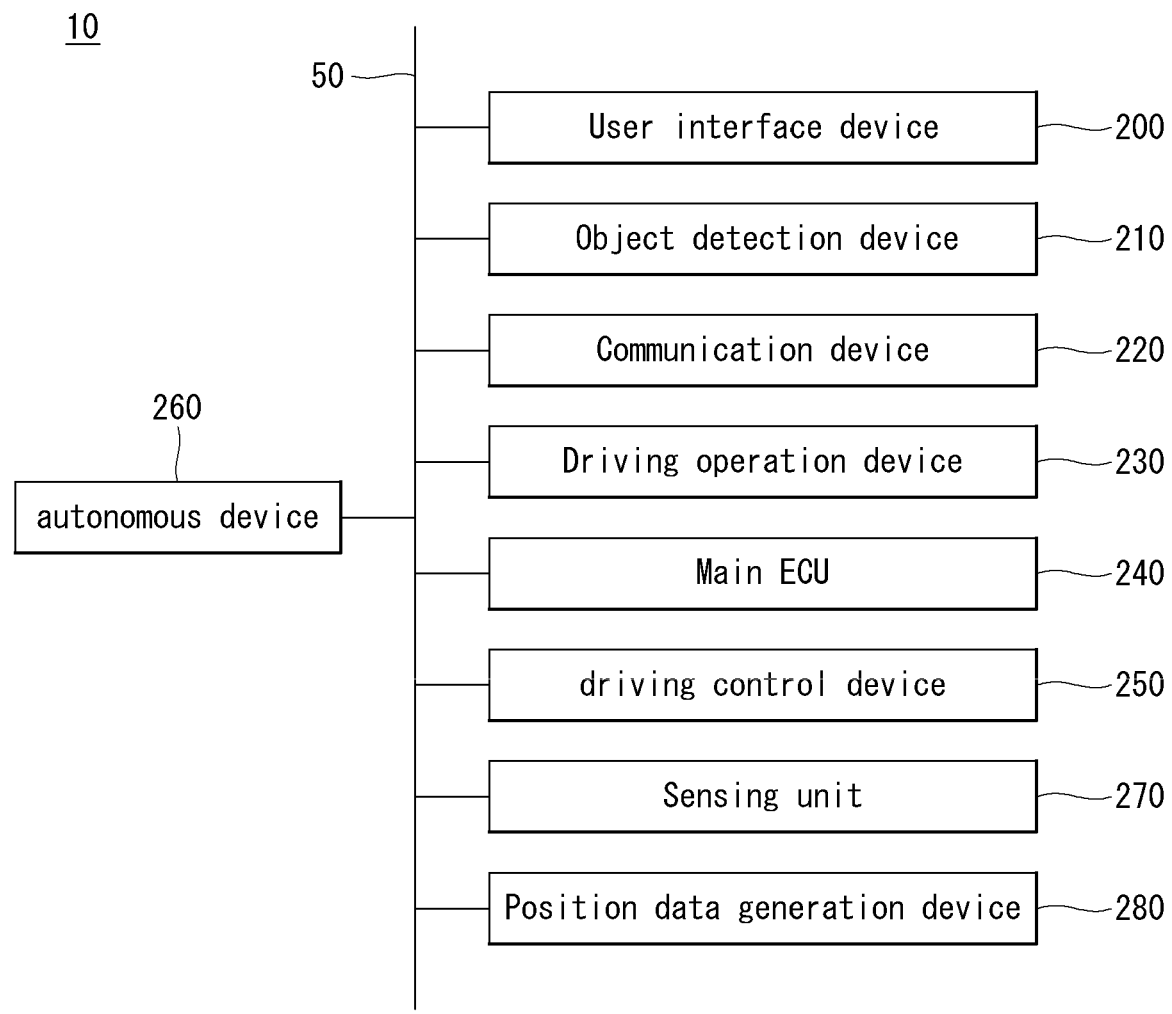
FIG. 6 is a control block diagram of a vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
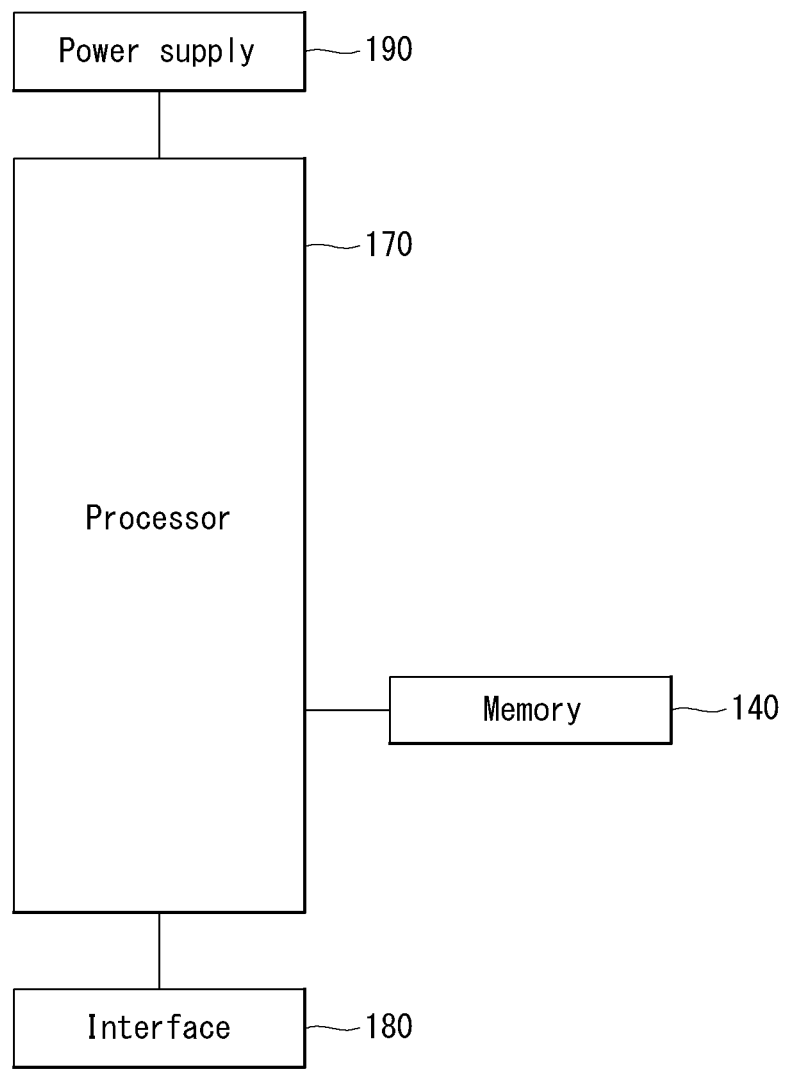
FIG. 7 is a control block diagram of an autonomous vehicle according to an embodiment of the present disclosure.

FIG. 7 is a control block diagram of the autonomous device according to an embodiment of the present disclosure.

Referring to FIG. 7, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 8:
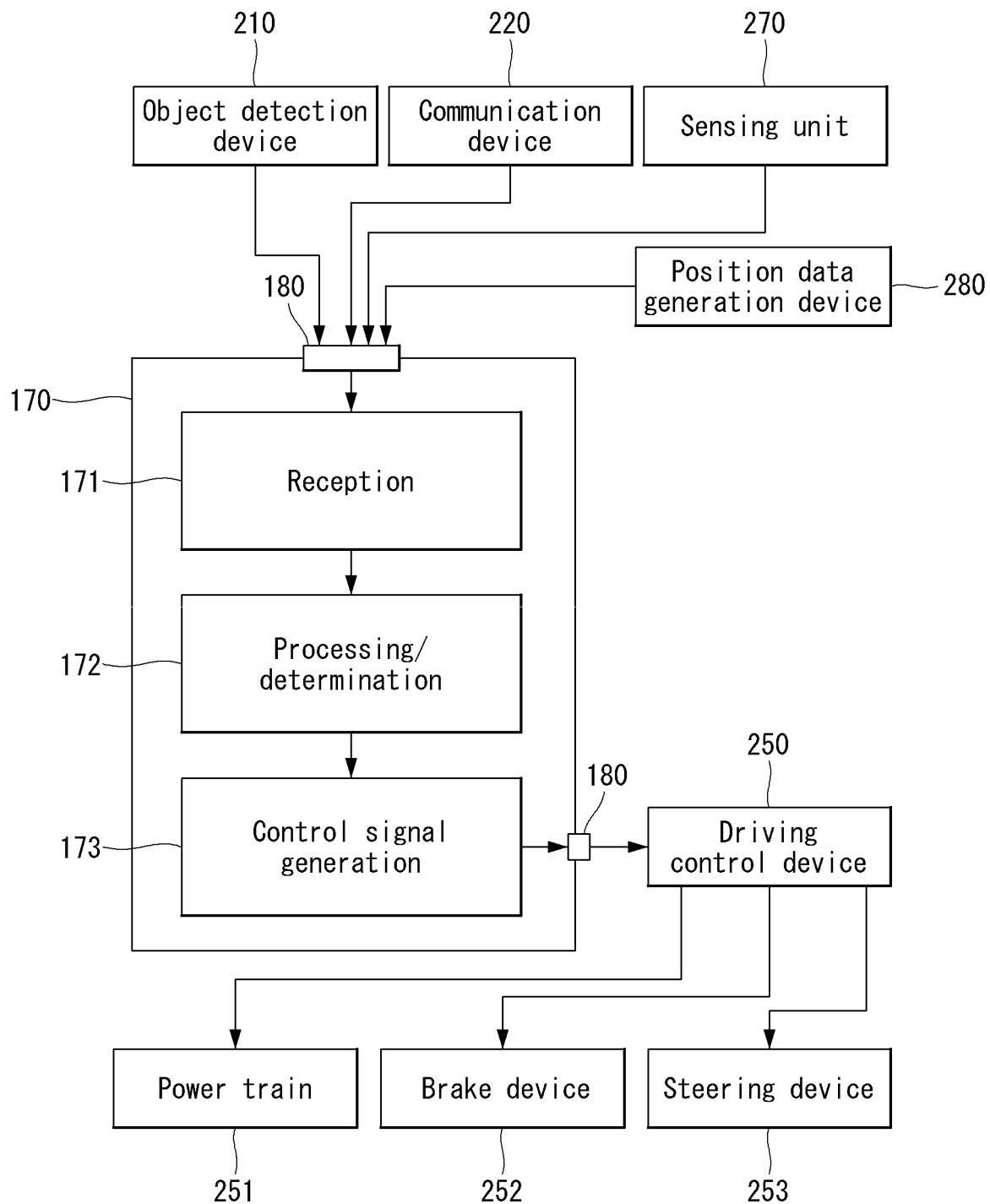
FIG. 8 is a signal flowchart of an autonomous vehicle according to an embodiment of the present disclosure.

FIG. 8 is a diagram showing a signal flow in an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Autonomous Vehicle Usage Scenarios

Figure 9:
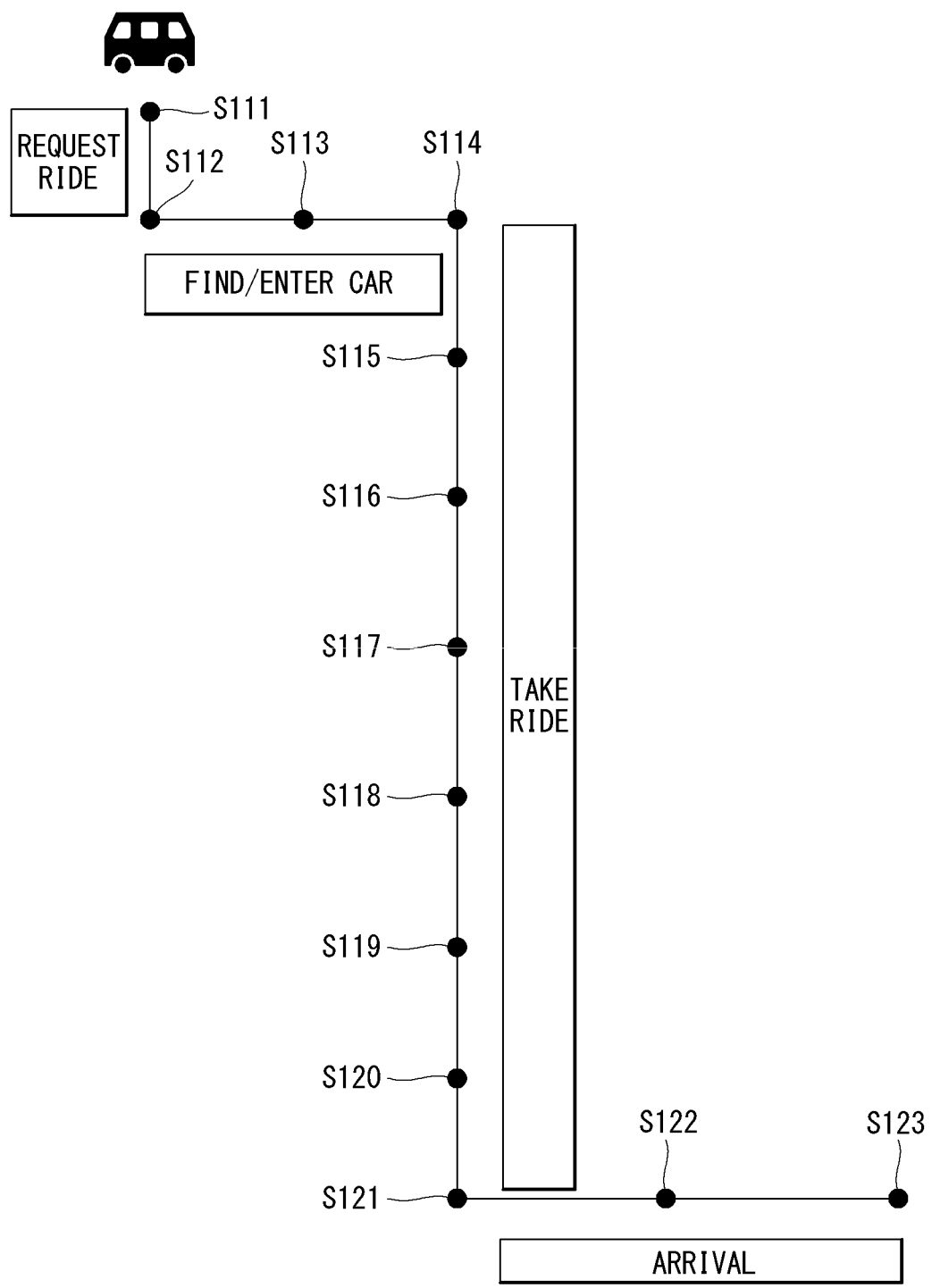
FIG. 9 is a diagram referred to in describing a use scenario of a user according to an embodiment of the present disclosure.

FIG. 9 is a diagram referred to in description of a usage scenario of a user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

V2X (Vehicle-to-Everything)

Figure 10:
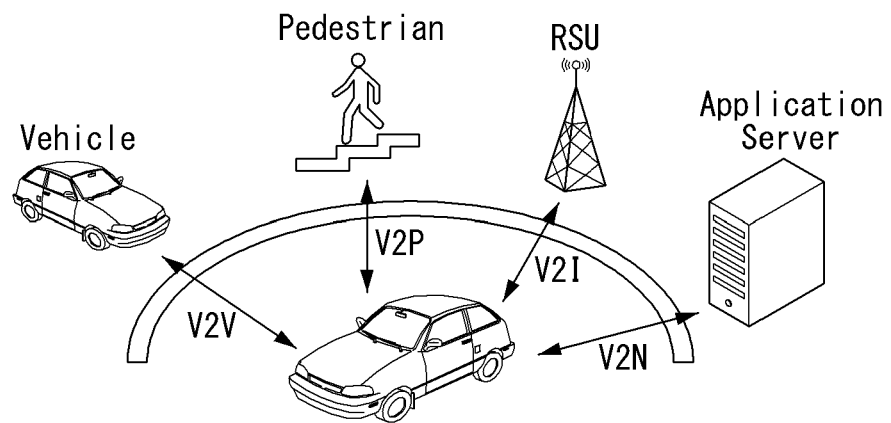
FIG. 10 is an example of vehicle-to-everything (V2X) communication to which the present disclosure can be applied.

FIG. 10 illustrates V2X communication to which the present disclosure is applicable.

V2X communication includes communication between a vehicle and any entity, such as V2V (Vehicle-to-Vehicle) referring to communication between vehicles, V2I (Vehicle to Infrastructure) referring to communication between a vehicle and an eNB or a road side unit (RSU), V2P (Vehicle-to-Pedestrian) referring to communication between a vehicle and a UE carried by a person (a pedestrian, a bicycle driver, or a vehicle driver or passenger), and V2N (vehicle-to-network).

V2X communication may refer to the same meaning as V2X sidelink or NR V2X or refer to a wider meaning including V2X sidelink or NR V2X.

V2X communication is applicable to various services such as forward collision warning, automated parking system, cooperative adaptive cruise control (CACC), control loss warning, traffic line warning, vehicle vulnerable safety warning, emergency vehicle warning, curved road traveling speed warning, and traffic flow control.

V2X communication can be provided through a PC5 interface and/or a Uu interface. In this case, specific network entities for supporting communication between vehicles and every entity can be present in wireless communication systems supporting V2X communication. For example, the network entities may be a BS (eNB), a road side unit (RSU), a UE, an application server (e.g., traffic safety server) and the like.

Further, a UE which performs V2X communication may refer to a vehicle UE (V-UE), a pedestrian UE, a BS type (eNB type) RSU, a UE type RSU and a robot including a communication module as well as a handheld UE.

V2X communication can be directly performed between UEs or performed through the network entities. V2X operation modes can be categorized according to V2X communication execution methods.

V2X communication is required to support pseudonymity and privacy of UEs when a V2X application is used such that an operator or a third party cannot track a UE identifier within an area in which V2X is supported.

The terms frequently used in V2X communication are defined as follows.

RSU (Road Side Unit): RSU is a V2X service enabled device which can perform transmission/reception to/from moving vehicles using a V2I service. In addition, the RSU is a fixed infrastructure entity supporting a V2X application and can exchange messages with other entities supporting the V2X application. The RSU is a term frequently used in conventional ITS specifications and is introduced to 3GPP specifications in order to allow documents to be able to be read more easily in ITS industry. The RSU is a logical entity which combines V2X application logic with the function of a BS (BS-type RSU) or a UE (UE-type RSU).

V2I service: A type of V2X service having a vehicle as one side and an entity belonging to infrastructures as the other side.

V2P service: A type of V2X service having a vehicle as one side and a device carried by a person (e.g., a pedestrian, a bicycle rider, a driver or a handheld UE device carried by a fellow passenger) as the other side.

V2X service: A 3GPP communication service type related to a device performing transmission/reception to/from a vehicle.

V2X enabled UE: UE supporting V2X service.

V2V service: A V2X service type having vehicles as both sides.

V2V communication range: A range of direct communication between two vehicles participating in V2V service.

V2X applications called V2X (Vehicle-to-Everything) include four types of (1) vehicle-to-vehicle (V2V), (2) vehicle-to-infrastructure (V2I), (3) vehicle-to-network (V2N) and (4) vehicle-to-pedestrian (V2P) as described above.

Figure 11:
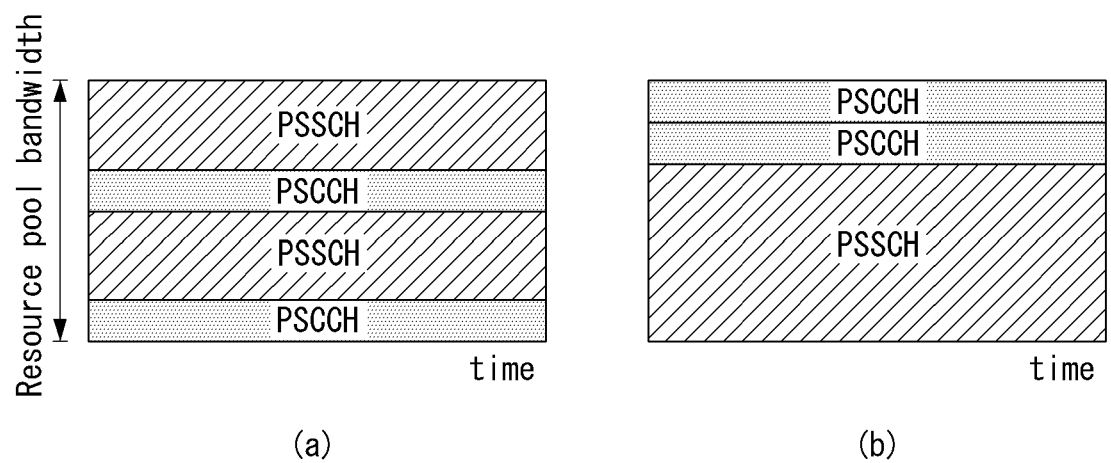
FIG. 11 shows an example of a method for allocating a resource in a sidelink where V2X is used.

FIG. 11 illustrates a resource allocation method in siderink in which V2X is used.

On sidelink, different physical sidelink control channels (PSCCHs) may be spaced and allocated in the frequency domain and different physical sidelink shared channels (PSSCHs) may be spaced and allocated. Alternatively, different PSCCHs may be continuously allocated in the frequency domain and PSSCHs may also be continuously allocated in the frequency domain.

NR V2X

To extend 3GPP platform to auto industry during 3GPP release 14 and 15, support for V2V and V2X services has been introduced in LTE.

Requirements for support for enhanced V2X use cases are arranged into four use example groups.

(1) Vehicle platooning enables dynamic formation of a platoon in which vehicles move together. All vehicles in a platoon obtain information from the leading vehicle in order to manage the platoon. Such information allows vehicles to travel in harmony rather than traveling in a normal direction and to move together in the same direction.

(2) Extended sensors allow vehicles, road side units, pedestrian devices and V2X application servers to exchange raw data or processed data collected through local sensors or live video images. A vehicle can enhance recognition of environment beyond a level that can be detected by a sensor thereof and can ascertain local circumstances more extensively and generally. A high data transfer rate is one of major characteristics.

(3) Advanced driving enables semi-automatic or full-automatic driving. Each vehicle and/or RSU share data recognized thereby and obtained from local sensors with a neighboring vehicle, and a vehicle can synchronize and adjust a trajectory or maneuver. Each vehicle shares driving intention with a neighboring traveling vehicle.

(4) Remote driving enables a remote driver or a V2X application to drive a remote vehicle for a passenger who cannot drive or cannot drive a remote vehicle in a dangerous environment. When changes are limited and routes can be predicted such as public transportation, driving based on cloud computing can be used. High reliability and low latency time are major requirements.

The 5G communication technology described above can be applied in combination with methods proposed in the present disclosure to be described below or can be added to make the technical characteristics of the methods proposed in the present disclosure embodied or clear.

Hereafter, a method and apparatus for controlling a vehicle in an autonomous driving system according to an embodiment of the present disclosure is described.

In an autonomous driving system, when passengers alight from a vehicle that transport passengers such as a bus or a taxi, there is a possibility that a two-wheel vehicle such as a bicycle or a motorcycle collides with passengers while passing between the vehicle and a sidewalk, and an accident due to the collision occurs.

Accordingly, it is possible to provide an autonomous driving system that prevents entry of a motorcycle by changing the formation of vehicles in a platoon so that the motorcycle cannot enter a passenger boarding/alighting section while passengers board/alight at a position where a passenger transport vehicle such as a bus stop is stopped. A passenger transport vehicle according to an embodiment of the present disclosure can estimate a position of a motorcycle according to movement thereof through help of a rearward vehicle and the rearward vehicle can measure movement information (position, speed, and acceleration) of the motorcycle using a sensor and can share the movement information in advance with other vehicles in a platoon through V2X (vehicle-to-everything) communication.

Further, in an autonomous driving system according to an embodiment of the present disclosure, vehicles that form a platoon can maintain an inter-vehicle distance and perform a blocking operation in consideration of all of an expected movement position of a motorcycle and a turning gap within an inter-vehicle safety distance. As will be described below, rearward vehicles travel close to a sidewalk (a footway) for time expected to be taken by passengers to board/alight on/from a passenger transport vehicle, thereby being capable of preventing a motorcycle from entering a passenger boarding/alighting section.

It is possible to prevent occurrence of a collision accident by a motorcycle or a bicycle approaching from behind when passengers board/alight on/from a passenger transport vehicle through platooning in an autonomous driving system according to an embodiment of the present disclosure.

Operation Scenario

In an autonomous driving system, each vehicle can determine whether there is a passenger who intends to board/alight, and can transmit boarding/alighting information (boarding/alighting expectation information) through a message that is used in V2X communication when there is a passenger who intends to board/alight.

The message that is transmitted may include the number of alighting people, an alighting position, an expected time required for alighting, the expected number for boarding people, an expected time required for boarding, or a platooning request. Further, a vehicle can receive passenger information from another vehicle in the platoon and the number of people who will alight from each vehicle, whereby it is possible to calculate the total time that is expected to be taken by the vehicles included in the platoon.

Thereafter, when a motorcycle that is an object moving adjacent to vehicles that perform platooning is found, each bus can measure the position, speed, and acceleration of the motorcycle and can share sensing information of the motor cycle through a V2X message when the motorcycle passes by several buses before entering a passenger boarding/alighting point.

Thereafter, each bus calculates a turning traveling gap where it can avoid a collision with a forward vehicle when moving to a sidewalk (pavement). Buses in a safety distance can move toward the sidewalk (footway) in consideration of all turning traveling gaps.

If passengers input a departure, a destination, a boarding time when they make a reservation to board autonomous vehicles through their smartphones, the information (the departure, the destination, the boarding time) is transmitted from the smartphones to a server.

The server collects boarding reservation information of the autonomous vehicles.

When several passengers make a reservation to board autonomous vehicles, the server determines how many passengers will board and alight at corresponding stops by collecting all reservation information (a departure, a destination, a boarding time) of the passengers.

The server calculates and transmits the estimated number of boarding/alighting people in boarding/alighting and the expected time required in boarding/alighting to the autonomous vehicles.

Here, a request message depends on the type of a transmission message and a platoon formation of autonomous vehicle depends on the request message. For example, when the number of boarding/alighting people and boarding/alighting point information, it is possible to change the positions in the platoon of vehicles with a large number of boarding/alighting people or a large amount of time required in boarding/alighting. Further, when an object block instruction is included in the request message, it is possible to change the formation of a platoon into object entry block platoon formation.

The number of vehicles in a platoon may be determined on the basis of a platooning line or the movement speed of an object (e.g., a motorcycle) detected by one or more vehicles of vehicles. For example, the safety distance between vehicles may be changed in accordance with the movement speed of an object and, the higher the movement speed of an object, the more the number of vehicles that are grouped in platooning may increase.

The lateral gaps between vehicles in a platoon need to be narrower than the size (width) of an object approaching from behind. By adjusting the lateral gaps between vehicles in accordance with the size of an object, it is possible to prevent the object from cutting in.

When there is another additional vehicle to stop at a stop position for boarding/alighting, it is possible to change a platooning order for alighting on the basis of information of the expected number of boarding/alighting people. That is, it is possible to form a platooning line in order of vehicles with more number of boarding/alighting people or vehicles with longer expected top time, and wider gaps may be given in order in the platooning line. For example, a platooning line may be formed such that a rearward vehicle is positioned closer to a sidewalk than the foremost vehicle.

Further, when a specific vehicle positioned between other vehicles separates from a platoon line while the vehicles travel in a platoon, the vehicle behind the separating vehicle approaches the vehicle ahead of the separating vehicle, thereby being capable of maintaining the gaps of the vehicles within a predetermined range.

Further, each of vehicles included in a platoon can measure the current position and speed of an object and generate sensing information, sing a front lidar, a side radar, and a rear lidar of the vehicles. The sensing information is broadcasted to other vehicle in the platoon through a message using V2X communication, so the position and speed of an object among the vehicles forming the platoon.

Hereafter, a method and apparatus for preventing a collision in advance so that another object (a motorcycle and a bicycle) does not collide with a passenger when passengers board on or alight from a passenger transport vehicle in an autonomous driving system is described with reference to FIGS. 12 to 38.

Figure 12:
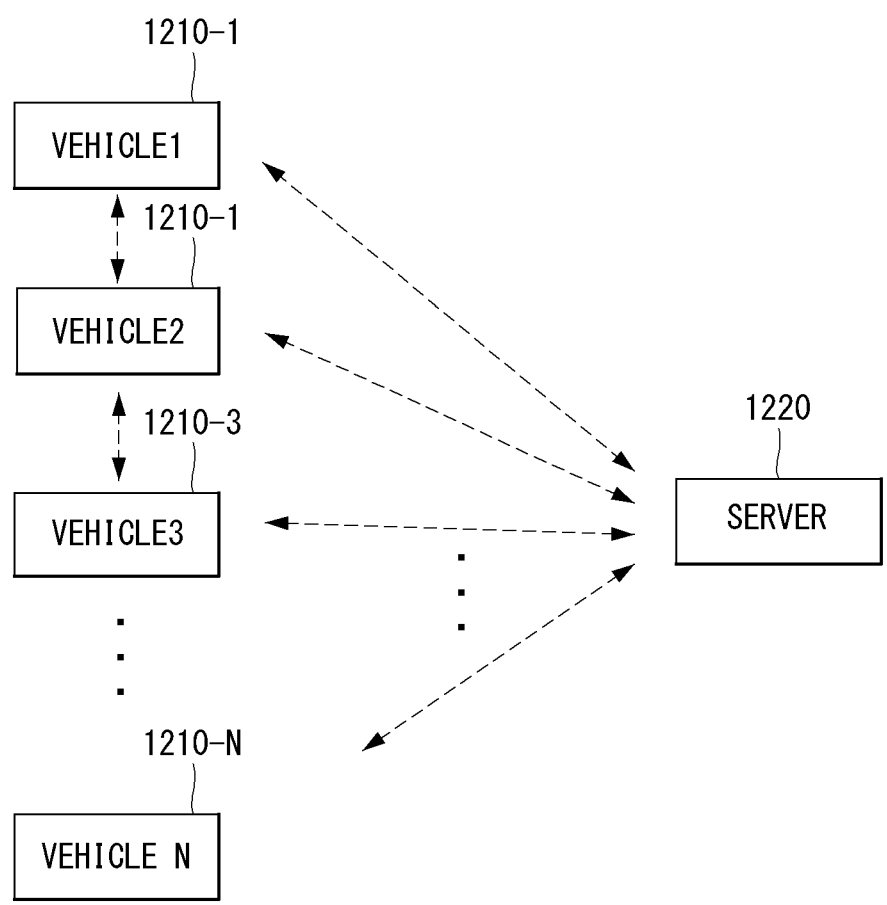
FIG. 12 shows an example of an autonomous driving system according to an embodiment of the present disclosure.

FIG. 12 shows an example of an autonomous driving system according to an embodiment of the present disclosure.

Referring to FIG. 12, an autonomous driving system according to an embodiment of the present disclosure includes a plurality of vehicles 1210-1 to 1210-N that travel in a platoon, and a server 1220 that provides data related to traveling to the plurality of vehicles 1210-1 to 1210-N.

The vehicles 1210-1 to 1210-N are substantially the same as the vehicle 10 described through FIGS. 5 to 11 and can enable passengers to alight or additional passengers to board at predetermined positions while transporting passenger. The vehicles 1210-1 to 1210-N can travel in a platoon. Hereafter, three vehicles are described for the convenience of description, in which a vehicle that transports passengers is described as a first vehicle 1210-1, a vehicle that approaches a sidewalk to prevent entry of an object when the first vehicle is stopped for passengers to board or alight is described as a second vehicle 1210-2, and a vehicle that detects an object traveling adjacent to the vehicles forming a platoon is described as a third vehicle 1210-3.

The server 1220 can provide data related to traveling to the vehicles 1210-1 to 1210-N and can receive data generated during traveling from the vehicles 1210-1 to 1210-N. In an embodiment of the present disclosure, the server 1220 can receive boarding and alighting reservation information of passengers from terminal devices (e.g., smartphones) and can transmit information related to boarding and alighting of passengers to the vehicles 1210-1 to 1210-N. In the following description, an example of a case in which the first vehicle 1210-1 receives boarding/alighting information of passengers from the server 1220 and a plurality of vehicles 1210-1 to 1210-N forming a platoon travel in a platoon formation for safe boarding/alighting of passengers is described.

Figure 13:
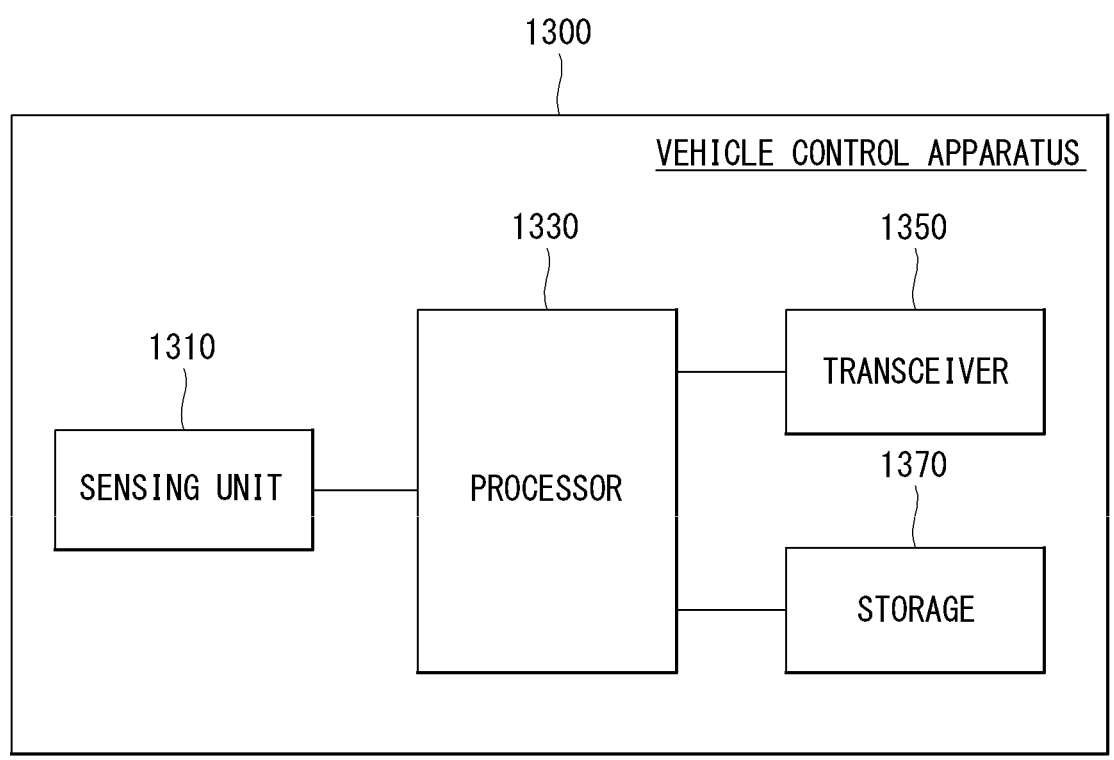
FIG. 13 shows an example of a block diagram of an apparatus for controlling a vehicle in an autonomous driving system according to an embodiment of the present disclosure.

FIG. 13 shows an example of a block diagram of an apparatus for controlling a vehicle in an autonomous driving system according to an embodiment of the present disclosure.

FIG. 13 shows an example of a vehicle control apparatus 1300 configured in each of the vehicles 1210-1 to 1210-N of FIG. 12. That is, the vehicle control apparatus 1300 shown in FIG. 13 may be configured for each of the first vehicle 1210-1, the second vehicle 1210-2, and the third vehicle 1210-3. The vehicle control apparatus 1300 can control traveling of a vehicle by being coupled to other components of the vehicle such as a driving unit, a power transmission unit, a braking unit, or a steering unit of the vehicle.

Referring to FIG. 13, the vehicle control apparatus 1300 according to an embodiment of the present disclosure includes a sensing unit 1310 that generates sensing information around a vehicle, a processor 1320 that controls functions of a vehicle, a transceiver 1330 that transmits or receives signals, and a storage 1340 that stores data processed by the processor 1320.

The sensing unit 1310 can generate sensing information (e.g., the speed, acceleration, and position of an object) or image data around a vehicle and can transmit the generated sensing information to the processor 1320. In an embodiment of the present disclosure, the sensing unit 1310 may include at least one hardware module for generating sensing information. For example, the sensing unit 1310 may include a radar that detects objects around a vehicle using microwaves, a lidar that detects objects around a vehicle using light (laser), or a camera that generates image data around a vehicle. The sensing unit 1310 may perform the same function as the sensing unit 270 or the object detection device 210 of FIG. 6.

The processor 1320 may include at least one processing circuit. The processor 1320 can control the functions of a vehicle by executing instructions for the operations of hardware included in the vehicle. Further, the processor 1320 can perform operations according to an embodiment of the present disclosure by performing software stored in the storage 1340. The processor 1320 can perform the same function as the main ECU 240 and the vehicle driving device 250 of FIG. 6 and the processor 170 of FIG. 7.

The transceiver 1350 can perform signal transmission/reception with another entity through a wireless channel. The transceiver 1350 is configured like the communication devices 910 and 920 of FIG. 1 and can perform the procedures described with reference to FIGS. 2 to 4. Further, the transceiver 1350 can perform the same function as the communication device 220 of FIG. 6.

The storage 1370 can store data processed by the processor 1330 and provide instructions for performing the functions of a vehicle to the processor 1330. The storage 1370 can perform the same function as the memory 140 of FIG. 7.

Figure 14:
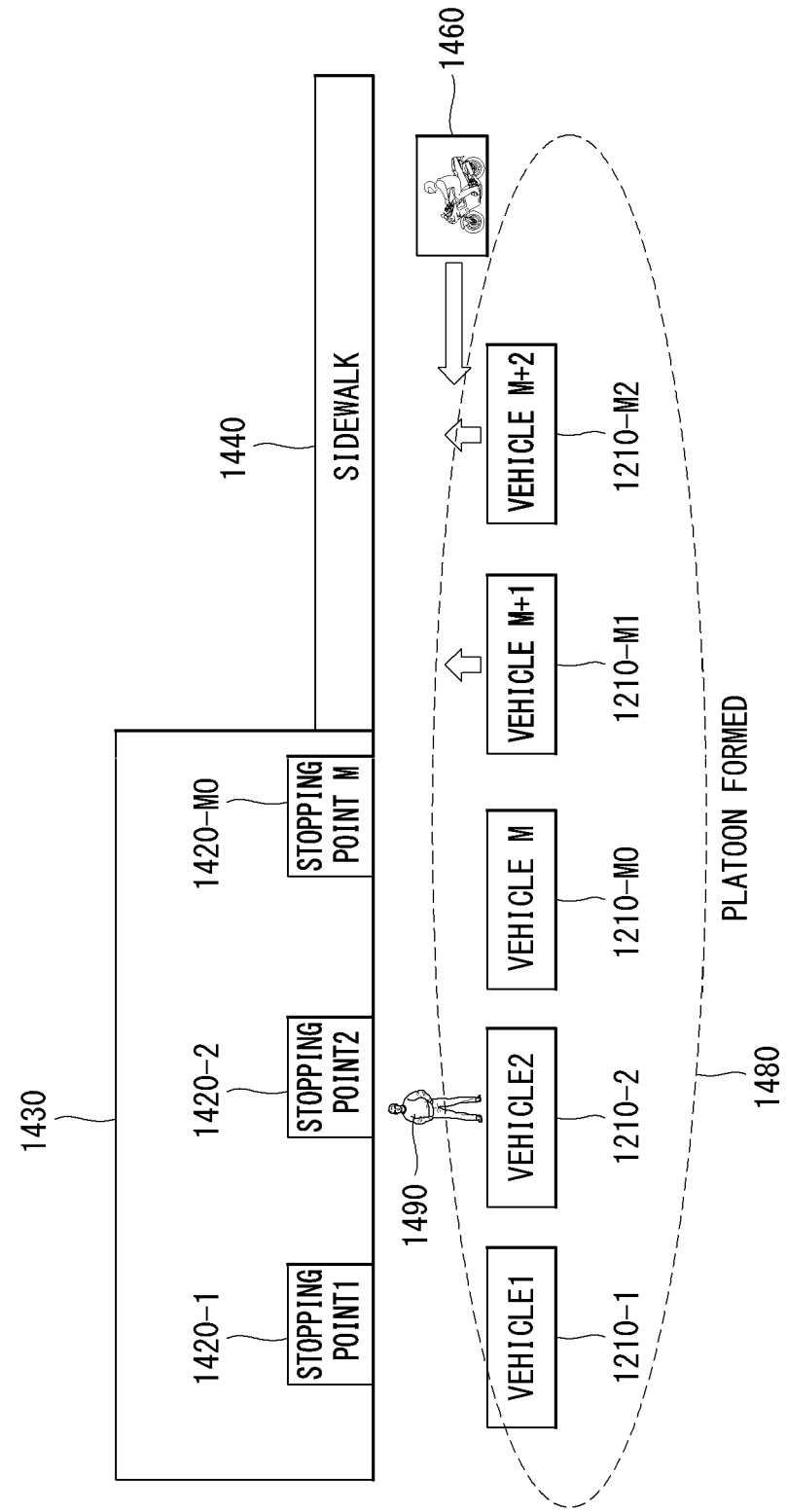
FIG. 14 shows an example when a plurality of vehicles travels in a platoon in an autonomous driving system according to an embodiment of the present disclosure.

FIG. 14 shows an example when a plurality of vehicles travels in a group in an autonomous driving system according to an embodiment of the present disclosure.

Referring to FIG. 14, in an autonomous driving system, vehicles (e.g., buses) that transport passengers 1210-1 to 1210-M2 form a platoon 1480 and some vehicles 1210-1 to 1210-M0 can tops at alighting points 1420-1 to 1420-M0 of a stop station for a passenger 1490 to board or alight. In this case, in order to prevent an object (e.g., a motorcycle) 1460 that may be a threat when the passenger 1490 boards/alights from entering a boarding/alighting section for passengers, some vehicles M+1 and M+2 (1210-M1 and 1210-M2) can move toward a sidewalk 1440.

Figure 15:
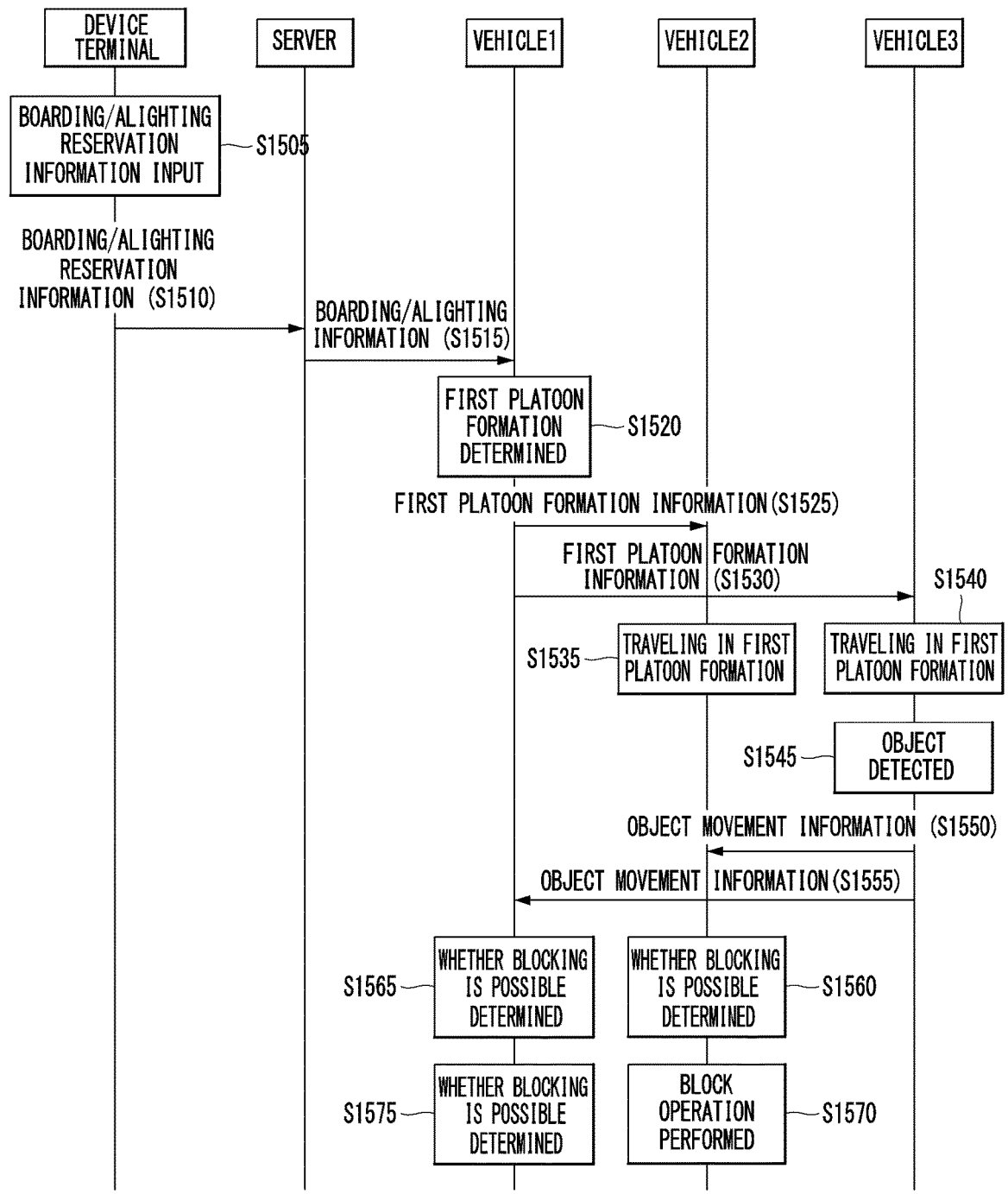
FIG. 15 shows an example of an operation flowchart of vehicles for providing a safe boarding/alighting environment in an autonomous driving system according to an embodiment of the present disclosure.

FIG. 15 shows an example of an operation flowchart of vehicles for providing a safe boarding/alighting environment in an autonomous driving system according to an embodiment of the present disclosure.

The autonomous driving vehicle in FIG. 15 includes: a terminal device 1230, a server 1220, a plurality of vehicles 1210-1 to 1210-3 traveling in a platoon, and the plurality of vehicles includes a first vehicle 1210-1 that transports passengers, a second vehicle 1210-2 that assists boarding/alighting of passengers of the first vehicle 1210-1, and the third vehicle 1210-3 that provides object sensing information to the first vehicle 1210-1 and the second vehicle 1210-2.

In step S1505, the terminal device 1230 can receive boarding/alighting reservation information input from a user. Here, the boarding/alighting reservation information may include a boarding position, a destination position, and a boarding time.

In step S1510, the terminal device 1230 can transmit the input boarding/alighting reservation information to the server 1220.

In step S1515, the server 1220 can transmit boarding/alighting information to the first vehicle 1210-1. Here, the boarding/alighting information may include a stopping position (stop information and stopping point), and the number of boarding/alighting people for each stopping position. That is, the first vehicle 1210-1 can receive boarding/alighting information of passengers from the server 1220.

In step S1520, the first vehicle 1210-1 can determine a first platoon formation on the basis of the boarding/alighting information such that the vehicles included in the platoon travel in the same lane as the first vehicle 1220-1.

In steps S1525 and S1530, the first vehicle 1210-1 transmits information about the first platoon formation (first platoon formation information) to the second vehicle 1210-2 and the third vehicle 1210-3 included in the platoon. The first platoon formation information may include a platoon formation change request instruction that requests other vehicles in the platoon to change the platoon.

In steps S1535 and S1540, the second vehicle 1210-2 and the third vehicle 1210-3 can travel in the first platoon formation determined by the first vehicle 1210-1.

In step S1545, the third vehicle 1210-3 can detect an object moving adjacent to the vehicles forming the platoon formation while traveling in the first platoon formation. Here, the third vehicle 1210-3 can measure the position, the speed, and the acceleration of an object when sensing the object.

In steps S1550 and S1555, the third vehicle 1210-3 transmits movement information of the object (object movement information) to the first vehicle 1220-1 and the second vehicle 1220-2. Here, the object movement information may include video data from which the object is detected, or object sensing information (the position, speed, and acceleration of the object).

In step S1560 and S1565, the first vehicle 1210-1 and the second vehicle 1210-2 can determine whether it is possible to block the detected object. In detail, the first vehicle 1210-1 and the second vehicle 1210-2 can check whether it is possible to block the object without collision with the object when approaching a sidewalk in consideration of the safe distance from a forward vehicle and the expected position of the object.

In step S1570, the second vehicle 1210-2 can perform a block operation when determining that it is possible to block the object. That is, the second vehicle 1210-2 can approach a sidewalk such that a block distance between the second vehicle 1210-2 and the sidewalk becomes smaller than the width of the object.

In step S1575, when the second vehicle 1210-2 determines whether it is possible to block the object by approaching the sidewalk, the first vehicle 1210-1 can open an entrance such that passengers can board/alight or can output a message saying that that object that is dangerous to the passengers is approaching.

Figure 16:
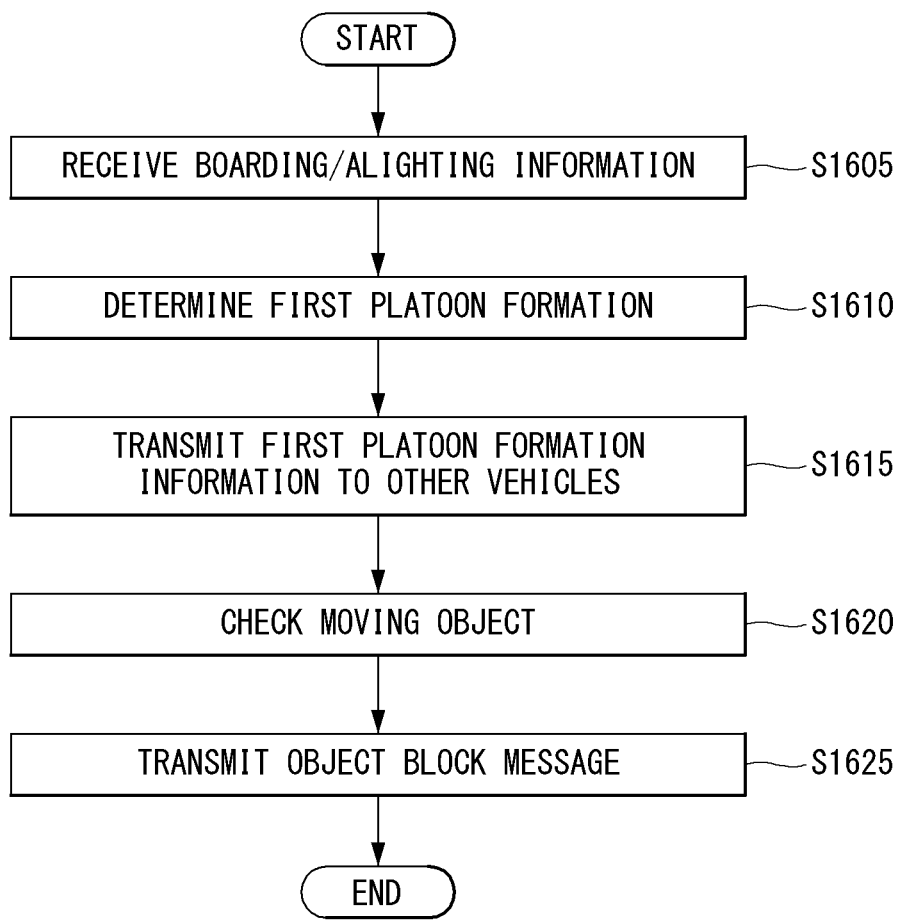
FIG. 16 shows an example of an operation flowchart of a first vehicle that transports passengers in an autonomous driving system according to an embodiment of the present disclosure.

FIG. 16 shows an example of an operation flowchart of a first vehicle that transports passengers in an autonomous driving system according to an embodiment of the present disclosure. FIG. 16 shows an example of an operation flowchart of the first vehicle 1210-1 that transports passengers in the autonomous driving system of FIG. 12.

In step S1605, the first vehicle 1210-1 receives boarding/alighting information of passengers from the server 1220. Here, the boarding/alighting information may include a stopping position (stop information and stopping point), and the number of boarding/alighting people for each stopping position.

In step S1610, the first vehicle 1210-1 determines a first platoon formation on the basis of the boarding/alighting information in which the vehicles included in the platoon travel in the same lane as the first vehicle 1220-1. The first vehicle can form a platoon for vehicles that stop at a boarding/alighting position of passengers or pass by a boarding/alighting position, and can determine the first platoon formation that shows the initial order and the initial position of each vehicle.

In step S1615, the first vehicle 1210-1 transmits information about the first platoon formation to other vehicle included in the platoon. The vehicles that receive the information about the first platoon formation from the first vehicle 1210-1 can travel in a platoon with the first vehicle 1210-1.

In step S1620, the first vehicle 1210-1 can check an object moving adjacent to the lane in which the vehicles forming the platoon travel. The first vehicle 1210-1 can check an object through a sensor or check an object by receiving movement information of the object from other vehicles (e.g., the third vehicle 1210-3) in the platoon.

In step S1625, the first vehicle 1210-1 transmits an object block instruction message, which changes the platoon formation into a second platoon formation such that the block distance between at least one vehicle included in the platoon and a sidewalk becomes smaller than the width of the object, to other vehicles included in the platoon. At least one vehicle that can approach the sidewalk of the vehicles receiving the object block instruction message can approach the sidewalk such that the object cannot enter between a bus and the sidewalk.

Figure 17:
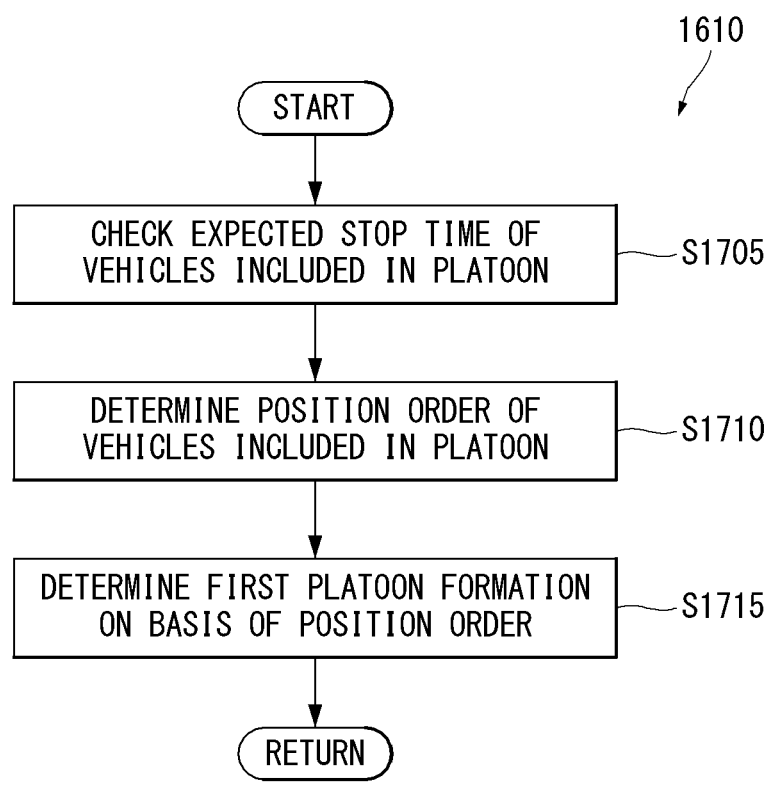
FIG. 17 shows an example of an operation flowchart of the first vehicle for determining a first platoon formation in an autonomous driving system according to an embodiment of the present disclosure.

FIG. 17 shows an example of an operation flowchart of the first vehicle for determining a first platoon formation in an autonomous driving system according to an embodiment of the present disclosure. FIG. 17 shows an example of step S1610 of FIG. 16.

In step S1705, the first vehicle 1210-1 checks an expected stop time of each of vehicles included in a platoon at a stopping position. For example, the first vehicle 1210-1 can check an expected stop time of each of vehicles included in a platoon through V2X communication or a server.

In step S1710 and step S1715, the first vehicle 1210-1 determines the order with respect to the positions of the vehicles included in the platoon on the basis of the expected stop time of each of vehicles included in a platoon, and determines a first platoon formation in accordance with the order of the vehicles. Here, it is possible to form a platooning line in order or vehicles with more number of boarding/alighting people or vehicles with longer expected top time, and wider gaps may be given in order to the platooning line. For example, a platooning line may be formed such that a rearward vehicle is positioned closer to a sidewalk than the foremost vehicle.

Figure 18:
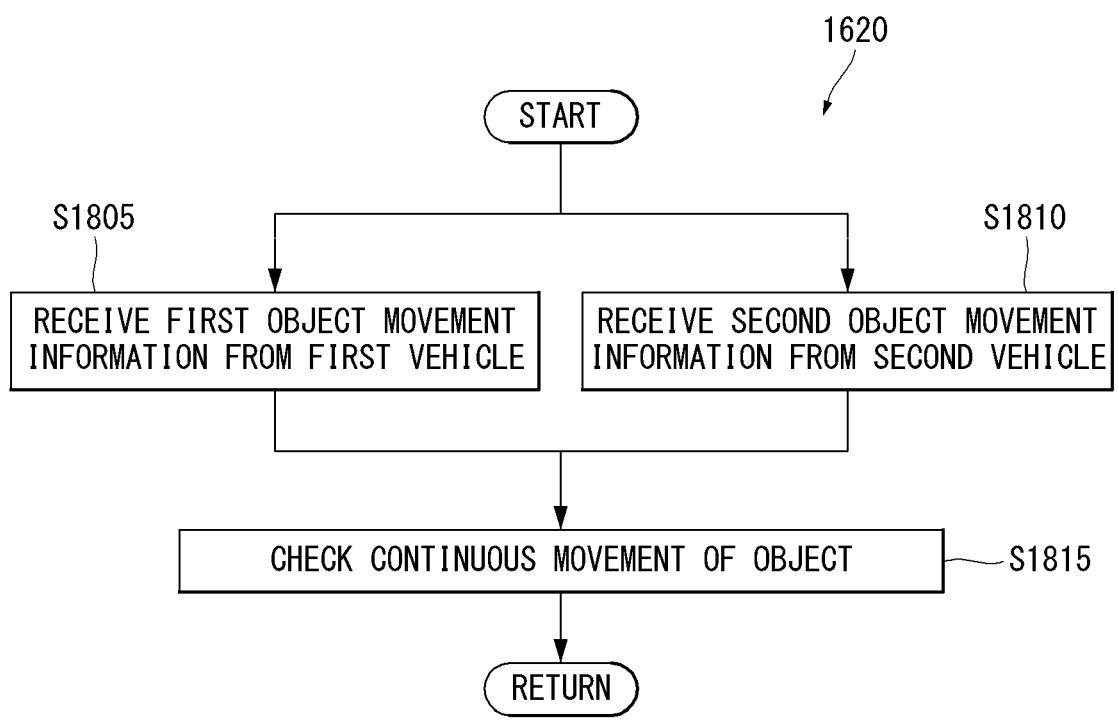
FIG. 18 shows an example of an operation flowchart of the first vehicle for checking an object in an autonomous driving system according to an embodiment of the present disclosure.

FIG. 18 shows an example of an operation flowchart of the first vehicle for checking an object in an autonomous driving system according to an embodiment of the present disclosure. FIG. 18 shows an example of step S1620 of FIG. 16.

In step S1805 and step S1810, the first vehicle 1210-1 receives first object movement information about movement of an object in a first area that is a surrounding area of the second vehicle 1210-2 from the second vehicle 1210-2 traveling behind the first vehicle 1210-1, and receives second object movement information about movement of the object in a second area that is a surrounding area of the third vehicle 1210-3 from the third vehicle 1210-3 traveling behind the second vehicle 1210-2. That is, the first vehicle 1210-1 receives movement information of an object detected around several vehicles.

In step S1815, the first vehicle 1210-1 checks continuous movement of the object in the first area and the second area on the basis of the first object movement information and the second object movement information. That is, the first vehicle 1210-1 can determine that the object is an object that may be a threat to pedestrian because the object is passing several vehicles in the platoon.

Figure 19:
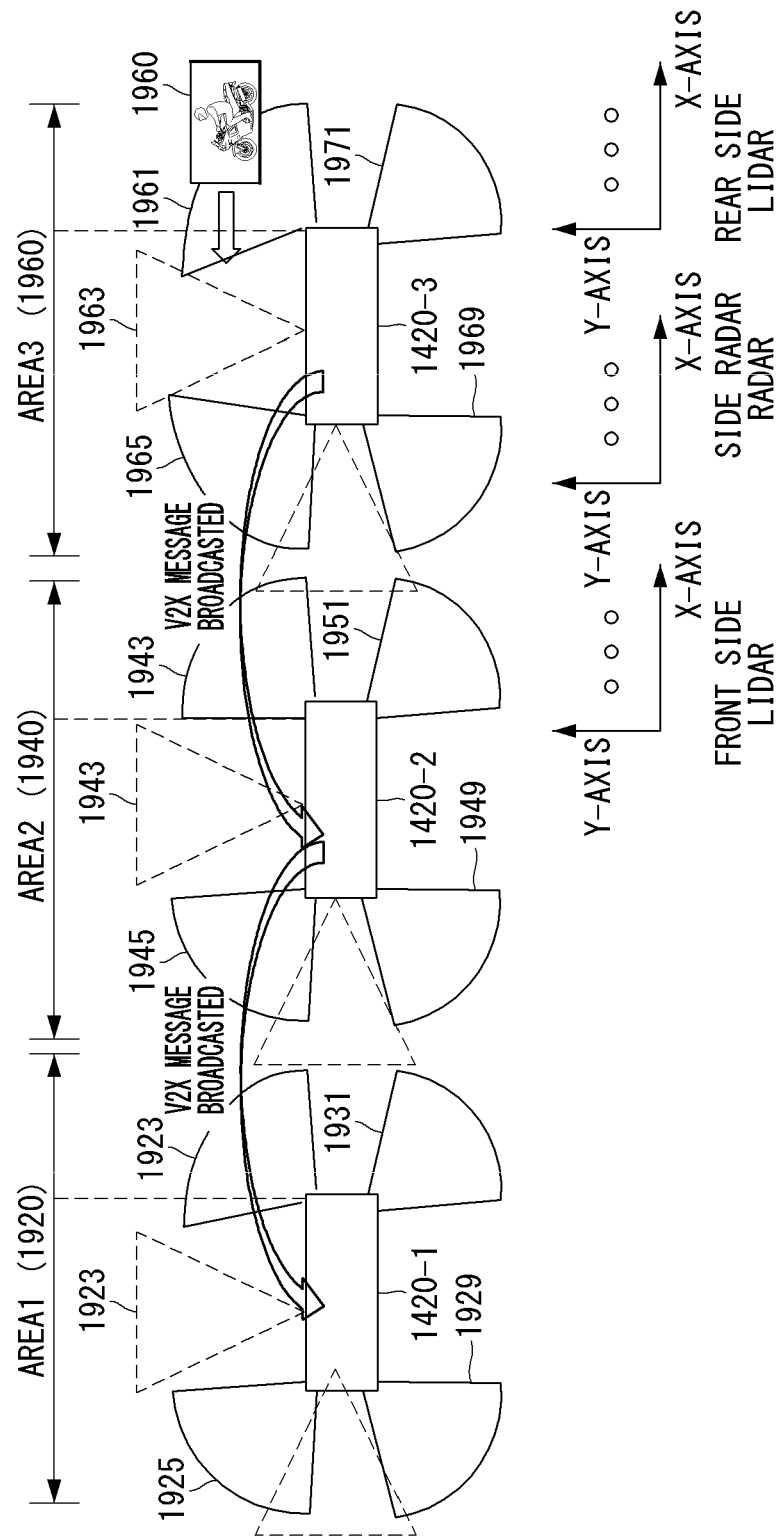
FIG. 19 shows an example of areas where vehicles forming a platoon detect an object in an autonomous driving system according to an embodiment of the present disclosure.

FIG. 19 shows an example of areas where vehicles forming a platoon detect an object in an autonomous driving system according to an embodiment of the present disclosure.

Referring to FIG. 19, areas 1920, 1940, and 1960 that are sensed respectively by vehicles 1420-1, 1420-2, and 1430-3 forming a platoon exist. When an object is detected in the areas 1920, 1940, and 1960 that can be sensed respectively by vehicles 1420-1, 1420-2, and 1430-3, information about the object can be shared to vehicles in the platoon through a V2X message. For example, when an object 1460 moving in a third area 1960 that is an area that can be sensed by the third vehicle 1420-3 is detected, a V2X message can be broadcasted to other vehicles 1420-1 and 1420-2 in the platoon.

Further, as shown in FIG. 19, the measurement area of each vehicle may be composed of sub-areas set for a sensor position of the vehicles. Sub-areas constituting one measurement area may be set by a sensor or a camera configured in each vehicle. That is, each of the vehicles can detect an object using a plurality of sensors or cameras included in a sensing unit.

For example, referring to FIG. 19, a first area 1920 that is sensed by the first vehicle 1420-1 may include a sub-area 1921 that is sensed by a lidar installed on the right rear of the first vehicle 1420-1, a sub-area 1923 that is sensed by a radar installed on the right side of the first vehicle 1420-1, a sub-area 1925 that is sensed by a lidar installed on the right front of the first vehicle 1420-1, a sub-area 1927 that is sensed by a camera installed on the front of the first vehicle 1420-1, a sub-area 1929 that is sensed by a lidar installed on the left front of the first vehicle 1420-1, and a sub-area 1931 that is sensed by a lidar installed on the right rear of the first vehicle 1420-1.

Further, a second area 1940 that is sensed by the second vehicle 1420-2 may include a sub-area 1941 that is sensed by a lidar installed on the right rear of the second vehicle 1420-2, a sub-area 1943 that is sensed by a radar installed on the right side of the second vehicle 1420-2, a sub-area 1945 that is sensed by a lidar installed on the right front of the second vehicle 1420-2, a sub-area 1947 that is sensed by a camera installed on the front of the second vehicle 1420-2, a sub-area 1949 that is sensed by a lidar installed on the left front of the second vehicle 1420-2, and a sub-area 1951 that is sensed by a lidar installed on the right rear of the second vehicle 1420-2. Further, a third area 1960 that is sensed by the third vehicle 1420-3 may include a sub-area 1961 that is sensed by a lidar installed on the right rear of the third vehicle 1420-3, a sub-area 1963 that is sensed by a radar installed on the right side of the third vehicle 1420-3, a sub-area 1965 that is sensed by a lidar installed on the right front of the third vehicle 1420-3, a sub-area 1967 that is sensed by a camera installed on the front of the third vehicle 1420-3, a sub-area 1969 that is sensed by a lidar installed on the left front of the third vehicle 1420-3, and a sub-area 1971 that is sensed by a lidar installed on the right rear of the third vehicle 1420-3.

Figure 20:
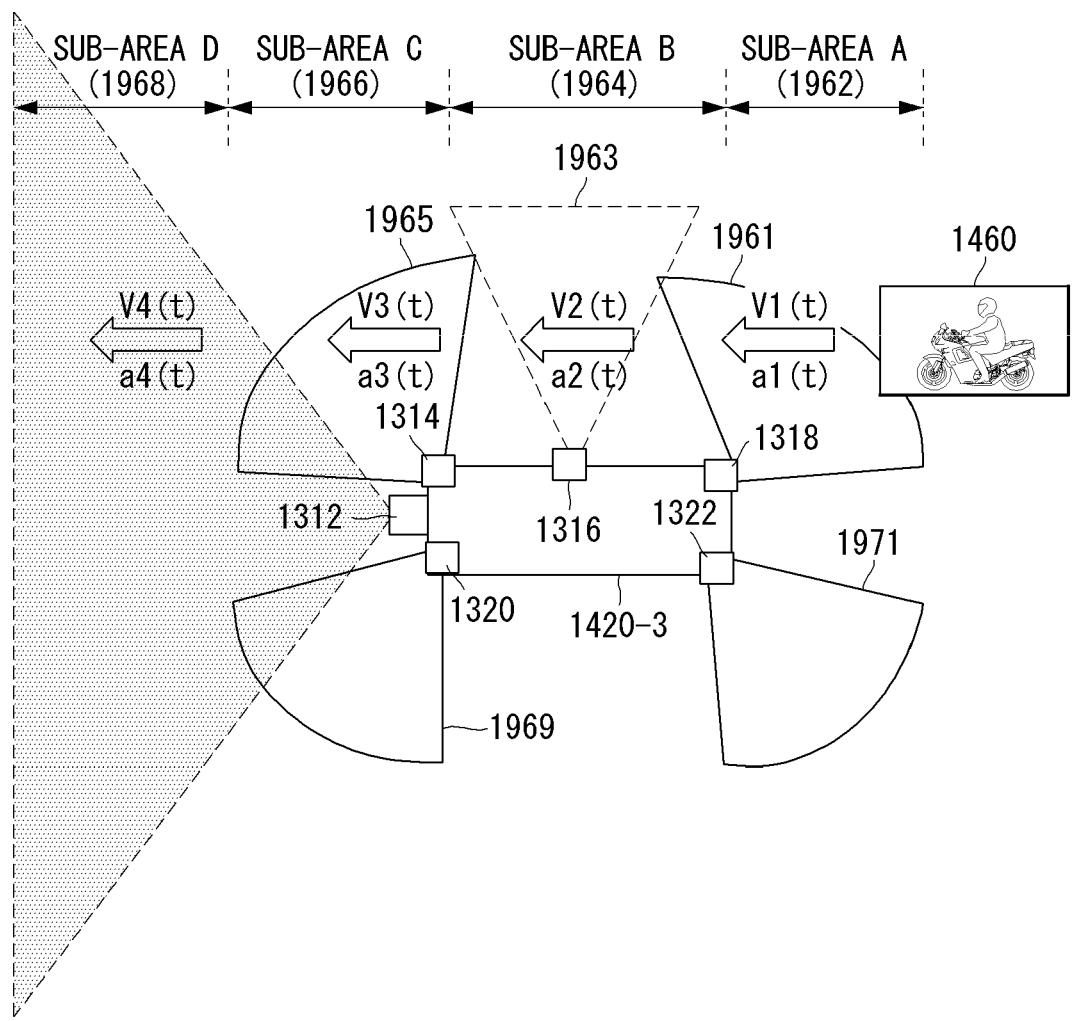
FIG. 20 shows an example of sub-areas for detecting an object around a vehicle in an autonomous driving system according to an embodiment of the present disclosure.

FIG. 20 shows an example of sub-areas for detecting an object around a vehicle in an autonomous driving system according to an embodiment of the present disclosure. FIG. 20 shows an example of sub-areas in a sensing area set by the third vehicle 1420-3 of FIG. 19.

Referring to FIG. 20, a sensing unit 1310 of the third vehicle 1420-3 includes a front camera 1312, a left front lidar 1314, a side radar 1316, a right rear lidar 1318, a left rear lidar 1322, and a left front lidar 1320. The cameras, radars, or lidars of the third vehicle 1420-3 can sense an object that shows up within a predetermined range of angle (e.g., 60 degrees).

In FIG. 20, the area that is sensed by the third vehicle 1420-3 may be composed of an area 1967 that is sensed by the front camera 1312, an area 1965 that is sensed by the right front lidar 1314, an area 1961 that is sensed b the right rear lidar 1318, an area 1971 that is sensed by the right rear lidar 1322, and an area 1969 that is sensed by the left front lidar 1320.

Here, the sensing information about the object 1460 may be generated for each of the sub-areas A to D (1962, 1964, 1966, and 1968) that are respectively sensed by the sensors of the third vehicle 1420-3. For example, when the object 1460 moves at the right side of the third vehicle 1420-3, the sub-area A (1962) corresponds to the area 1961 that is sensed by the right rear lidar 1318, and the sub-area B (1964) corresponds to the area 1963 that is sensed by the right radar 1316, and the sub-area C (1966) corresponds to the area 1965 that is sensed by the right front lidar 1314.

The third vehicle 1420-3 can generate movement information of the object for each sub-area and the movement information of the object may include the position, speed, and acceleration of the object. For example, when an object 1460 moving adjacent to the third vehicle 1420-3 is detected, the position, speed, and acceleration of the object 1460 can be measured for each of the sub-areas that are sensed by the third vehicle 1420-3. For example, when the object 1460 passes the third vehicle 1420-3 at the right side, the speed v1($t$) and the acceleration a1($t$) of the object 1460 when the object is in the sub-area A (1962), the speed v2($t$) and the acceleration a2($t$) of the object 1460 when the object is in the sub-area B (1964), the speed v3($t$) and the acceleration a3($t$) of the object 1460 when the object is in the sub-area C (1966), and the speed v4($t$) and the acceleration a4($t$) of the object 1460 when the object is in the sub-area D (1968) can be measured. The movement information of the object 1460 measured for each sub-area can be shared between vehicles included in a platoon, and the vehicles included in the platoon can perform a block operation while maintaining the gaps between the vehicles in consideration of all the expected position of the object 1460 and the turning angle of the vehicles in correspondence to detection of the object 1460.

Figure 21:
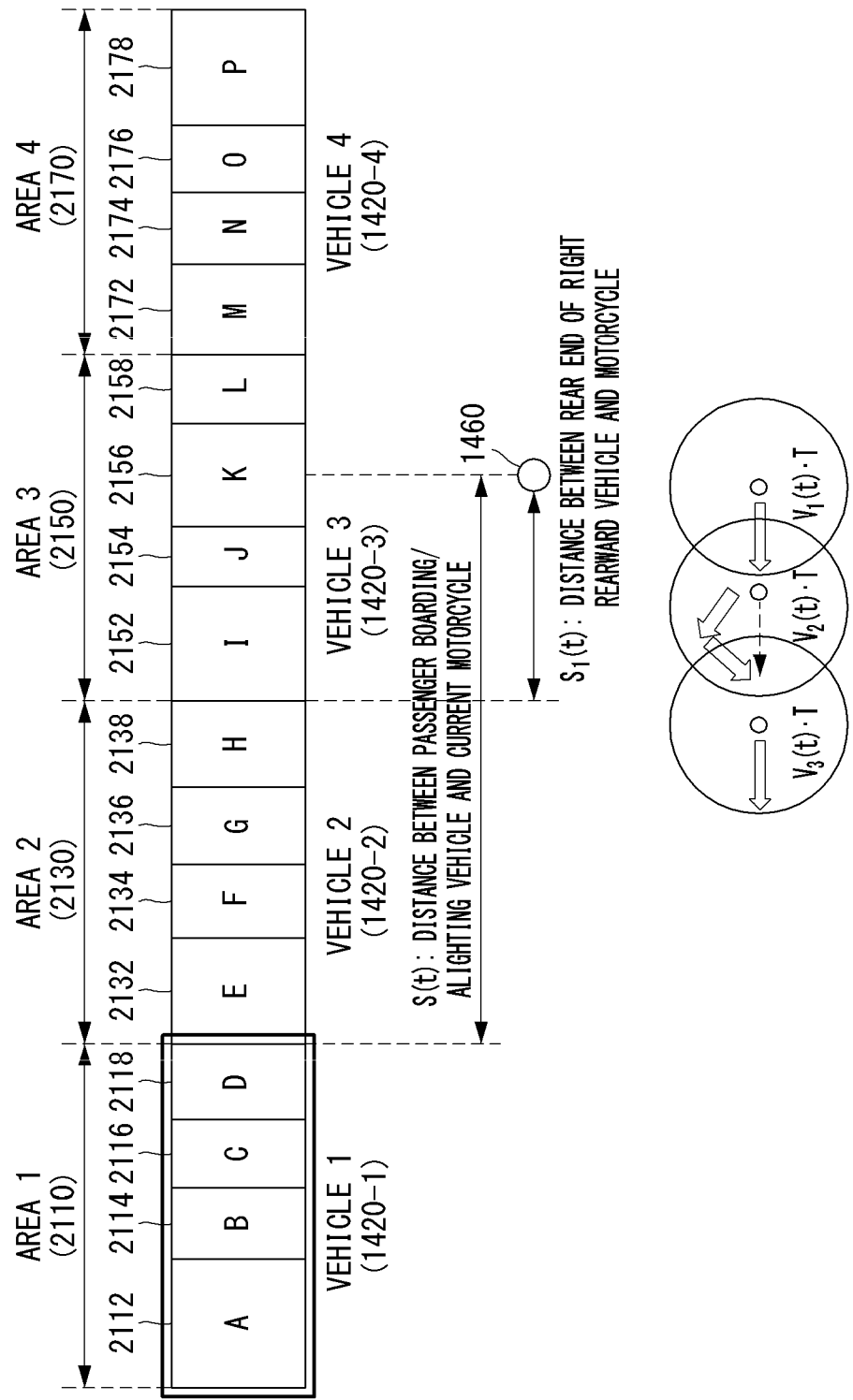
FIG. 21 shows an example of deriving the distance from an object using object sensing information of each area in an autonomous driving system according to an embodiment of the present disclosure.

FIG. 21 shows an example of deriving the distance from an object using object sensing information of each area in an autonomous driving system according to an embodiment of the present disclosure.

Referring to FIG. 1, areas 2110, 2130, 2150, and 2170 that are respectively sensed by vehicles in a platoon and sub-areas that are sensed by a sensor for each of the areas are shown. In FIG. 21, a first area 2110 that is an area sensed by an estimated passenger alighting vehicle 1420-1 is composed of sub-areas A, B, C, and D (2112, 2114, 2116, 2118) that are sensed by each sensor. Further, an area 2 (2130) is composed of sub-areas E, F, G, and H (2132, 2134, 2136, and 2138), an area 3 (2150) is composed of sub-areas I, J, K, and L (2152, 2154, 2156, and 2158), and an area 4 (2170) is composed of sub-areas M, N, O, and P (2172, 2174, 2176, and 2178).

For example, as shown in FIG. 21, when an object 1460 is positioned in the sub-area K (2156) of the area 3 (2150), the third vehicle 1420-3 checking that the object 1460 is positioned at a side of the third vehicle 1420-3 can transmit movement information of the object together with a message (V2X message) that is used for V2X communication to other vehicles in the platoon. Further, the object 1460 of FIG. 21 can be sensed by a camera positioned on the front of a fourth vehicle 1420-4 positioned behind the third vehicle 1420-3.

That is, the second vehicle 1420-2 can acquire the distance S($t$) between the first vehicle 1420-1, which passengers board/alight on/from, and the object 1460 and the S1($t$) between the rear end of the second vehicle 1420-2 and the object 1460 from object movement information included in the V2X message in order to block the object 1460 from passengers boarding on or alighting from the first vehicle 1420-1.

Figure 22:
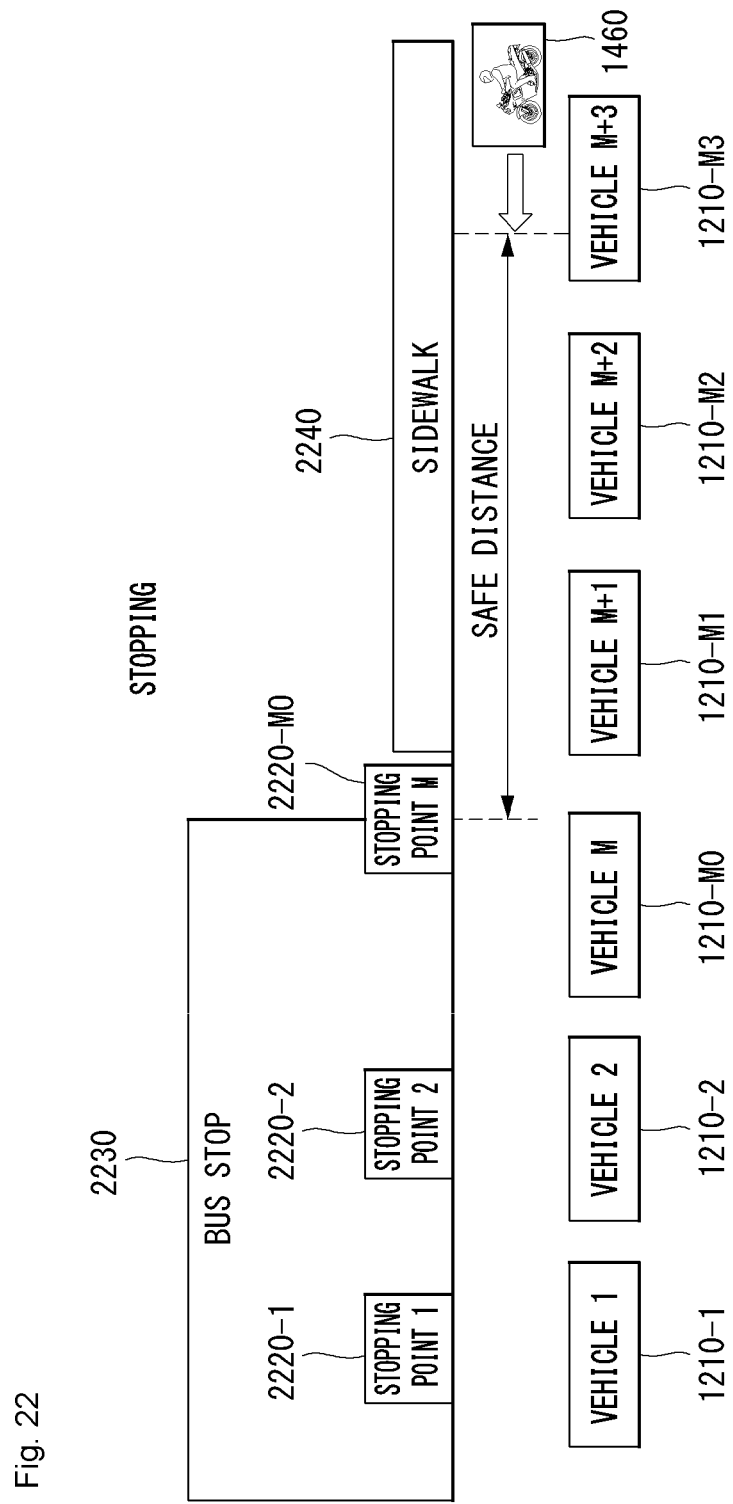
FIG. 22 shows an example of deriving a safe distance using object sensing information of each area in an autonomous driving system according to an embodiment of the present disclosure.

FIG. 22 shows an example of deriving a safe distance using object sensing information of each area in an autonomous driving system according to an embodiment of the present disclosure.

Referring to FIG. 22, an object 1460 moves adjacent to a vehicle 1 (1210-1), a vehicle 2 (1210-2), and a vehicle M (1210-M0), which passengers board/alight on/from, at an alighting point 1 (2220-1), an alighting point 2 (2220-2), and an alighting point M (2220-M) of a bus stop 2230. Here, a vehicle M+1, a vehicle M+2, and a vehicle M+3 can perform a block operation for blocking the object 1460 by approaching a sidewalk 2240.

First, a platoon of vehicles traveling in the same line as vehicles that stop at a bus stop is formed, the speed and the position of an object moving between buses and a sidewalk (footway) are monitored through at least one sensor (a right front lidar, a right side radar, and a right rear lidar), and then object movement information (speed, acceleration, position) is broadcasted to all vehicles in the platoon using V2X communication.

Thereafter, when vehicles stop at the bus stop, a master vehicle checks the numbers N of people alighting from each vehicle and determines time T that is expected for boarding or alighting for each of the numbers of people. Thereafter, the master vehicle determines time expected time (Ni*T) required for boarding/alighting of each vehicle (vehicle i) Accordingly, the total expected time Ttotal that is required when passengers board on or alight from all of vehicles M that passengers board on or alight from is $T_{total} = \Sigma_{t=1}^{i=M} N_i T$.

The master vehicle determines a platoon formation for protecting the passengers for the calculated total boarding/alighting expected time Ttotal and the vehicles included in the platoon can perform an object block operation for protecting the passengers from the object 1460.

Before the object 1460 arrives at an alighting point M (2220-M) within the total boarding/alighting expected time Ttotal, a vehicle M+3 (1210-3) spaced and positioned a safe distance apart from the lighting point (2220-M) blocks entry of the object 1460 by moving toward the sidewalk 2240. Here, the safe distance is a distance that the object 1460 can move at the maximum speed for the total boarding/alighting expected time Ttotal. The maximum speed of the object 1460 may be determined as the highest speed of speeds of the object 1460 measured by the vehicles in the platoon or may be determined in consideration of the speed and the acceleration of the object 1460.

Figure 23:
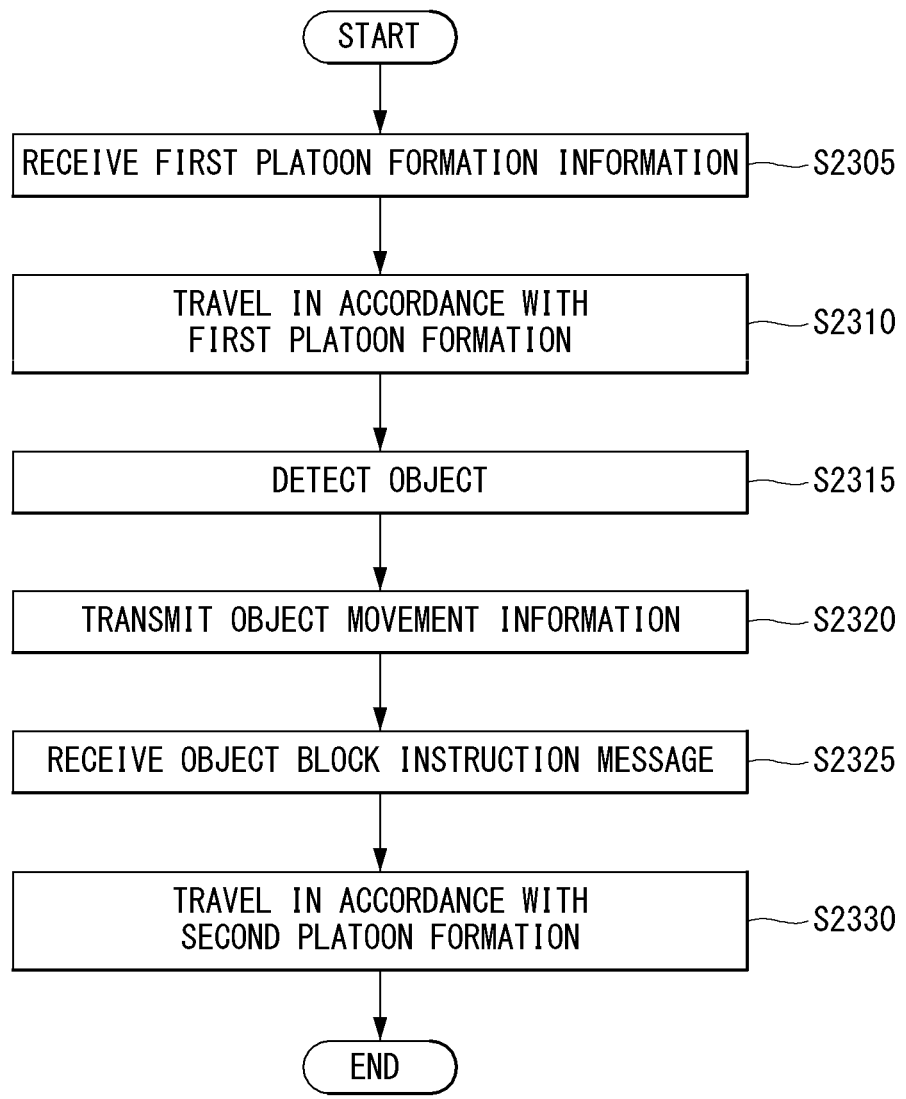
FIG. 23 shows an operation flowchart of a third vehicle providing object sensing information to a first vehicle that transports passengers and a second vehicle that assists boarding/alighting of the passengers of the first vehicle in an autonomous driving system according to an embodiment of the present disclosure.

FIG. 23 shows an operation flowchart of a third vehicle providing object sensing information to a first vehicle that transports passengers and a second vehicle that assists boarding/alighting of the passengers of the first vehicle in an autonomous driving system according to an embodiment of the present disclosure.

In step S2305, the third vehicle 1210-3 that provides object sensing information to vehicles in the platoon receives information about a first platoon formation from the first vehicle 1210-1. The vehicles that receive the information about the first platoon formation from the first vehicle 1210-1 can travel in a platoon with the first vehicle 1210-1.

In step S2310, the third vehicle 1210-3 travels in accordance with the first platoon formation. The third vehicle 1210-3 can monitor whether there is an object moving like a motorcycle adjacent to the platoon while traveling behind the first vehicle 1210-1.

In step S2315, the third vehicle 1210-3 can detect an object moving adjacent to the lane in which the vehicles travel in a platoon. The third vehicle 1210-3 can measure the position, the speed, and the acceleration of the object using a lidar, a radar, or a camera.

In step S2320, the third vehicle 1210-3 can transmit movement information of the object to the vehicles in the platoon. The movement information of the object may include the position, the speed, and the acceleration of the object, and the movement information of the object can be transmitted to the vehicles in the platoon through V2X communication.

In step S2325, the third vehicle 1210-3 can receive an object block instruction message, which instructs at least one vehicle in the platoon to change the platoon formation into a second platoon formation for moving toward the sidewalk, from the first vehicle 1210-1. In another embodiment of the present disclosure, the third vehicle 1210-3 can enter toward the sidewalk even without receiving the object block instruction message when it is detected that an object moves between a bus and the sidewalk.

In step S2330, the third vehicle 1210-3 travels in accordance with the second platoon formation. The third vehicle 1210-3 can approach the sidewalk such that the object cannot enter between the bus and the sidewalk.

Figure 24:
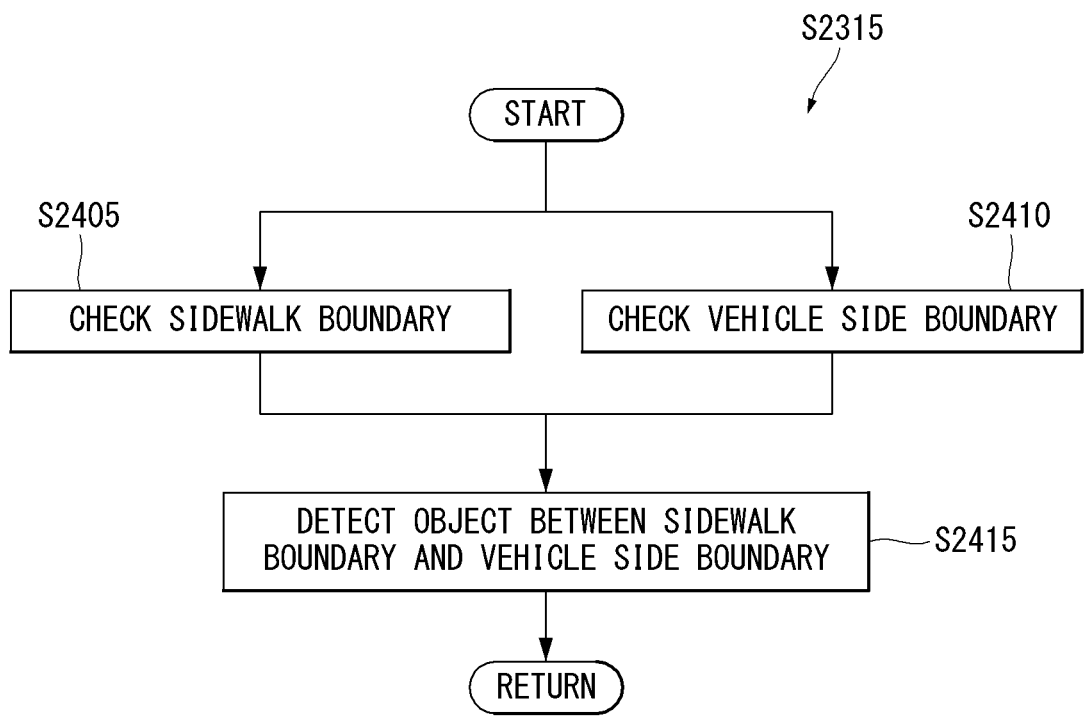
FIG. 24 shows an example of an operation flowchart of the third vehicle for detecting an object in an autonomous driving system according to an embodiment of the present disclosure.

FIG. 24 shows an example of an operation flowchart of the third vehicle for detecting an object in an autonomous driving system according to an embodiment of the present disclosure. FIG. 24 shows an example of step S2315 of FIG. 23.

In step S2405, the third vehicle 1210-3 can check a sidewalk boundary that is the boundary of a sidewalk adjacent to a roadway. For example, in FIGS. 25*a* and 25*b*, the boundary of a sidewalk 2540 can be checked.

In step S2410, the third vehicle 1210-3 can check a vehicle side boundary that is the side boundary of a vehicle. For example, side boundaries 2521, 2522, and 2523 of vehicles 1210-M1, 1210-M2, and 1210-M3 can be checked in FIGS. 25*a* and 25*b*.

In step S2415, the third vehicle 1210-3 can detect an object moving between a sidewalk boundary and a side boundary. For example, an object 2530 moving between a sidewalk 2540 and vehicle side boundaries 2521, 2522, and 2523 in FIGS. 25*a* and 25*b*.

FIGS. 25*a* and 25*b* show an example of detecting an object moving between a vehicle and a sidewalk in an autonomous driving system according to an embodiment of the present disclosure.

In FIGS. 25*a* and 25*b*, each of vehicles M+1, M+2, and M+3 (1210-M1, 1210-M2, and 1210-M3) can detect an object 2530 moving between vehicle walls 2521, 2522, and 2523 and a sidewalk 2540 or the vehicle walls 2521, 2522, and 2523 and a lane 2550.

For example, a vehicle M+1 (1210-M1) can detect the boundary of the sidewalk 2540 and the right wall 2521 of a vehicle from an image acquired through a camera, and can check whether there is an object moving between the boundary of the sidewalk 2540 and the vehicle wall 2521.

Figure 26:
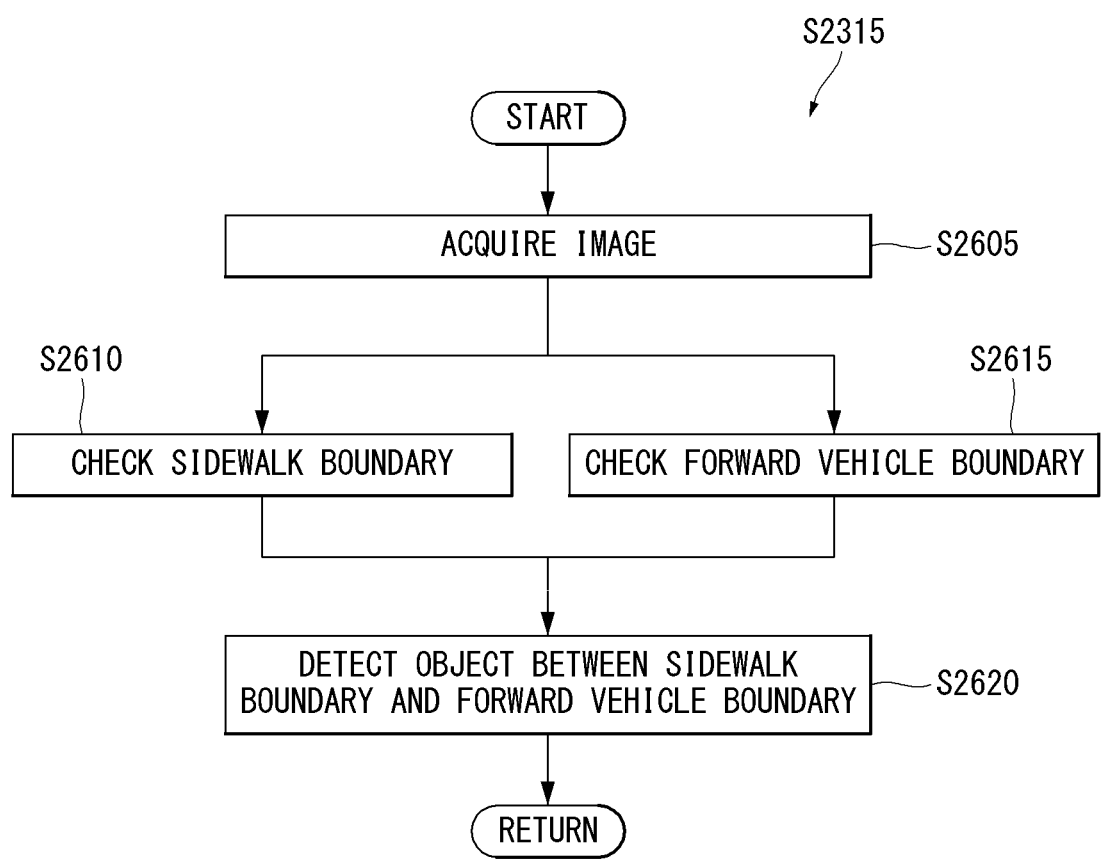
FIG. 26 shows another example of an operation flowchart of the third vehicle for detecting an object in an autonomous driving system according to an embodiment of the present disclosure.

FIG. 26 shows another example of an operation flowchart of the third vehicle for detecting an object in an autonomous driving system according to an embodiment of the present disclosure. FIG. 26 shows an example of step S2315 of FIG. 23.

In step S2605, the third vehicle 1210-3 can acquire an image acquired by a camera. The camera may be installed on the front of the third vehicle 1210-3 and the image acquired by the camera can include a scene around a vehicle positioned ahead of the third vehicle 1210-3.

In step S2610, the third vehicle 1210-3 can check the boundary of a sidewalk adjacent to a roadway in the image. For example, in FIG. 27, a sidewalk boundary 2715 that is the boundary of the sidewalk 2710 can be checked.

In step S2615, the third vehicle 1210-3 can check a vehicle boundary that is the boundary of a forward vehicle in the image. For example, in FIG. 27, a vehicle boundary 2725 that is the boundary of a forward vehicle 2720 can be checked. Further, wheel boundaries 2745 and 2755 that are the boundaries of wheels 2740 and 2750 of the forward vehicle 2720 may be used as the vehicle boundary.

In step S2620, the third vehicle 1210-3 can detect an object moving between a sidewalk boundary and a vehicle boundary of a forward vehicle. For example, in FIG. 27, movement of an object 2730 between the vehicle boundary 2725 of the forward vehicle 2750 and the sidewalk boundary 2715 of the sidewalk 2710 can be detected.

Figure 27:
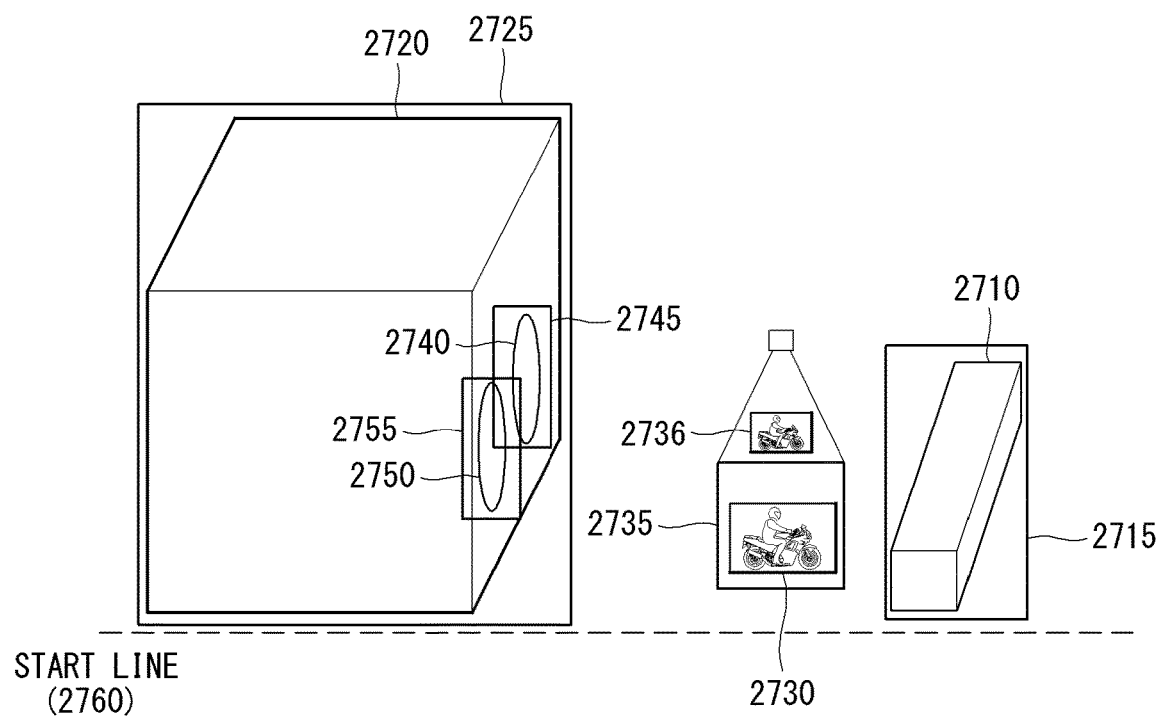
FIG. 27 shows another example of detecting an object moving between a vehicle and a sidewalk in an autonomous driving system according to an embodiment of the present disclosure.

FIG. 27 shows another example of detecting an object moving between a vehicle and a sidewalk in an autonomous driving system according to an embodiment of the present disclosure.

Referring to FIG. 27, an image acquired through a cameral positioned on the front of a vehicle includes the forward vehicle 2720, the sidewalk 2710, and a motorcycle 2730 that is a moving object. When the boundary 2725 of the forward vehicle 2720 and the boundary 2715 of the sidewalk that are seen from the rear are checked, an object 2730 moving between the boundary 2725 of the forward vehicle 2720 and the boundary 2715 of the sidewalk is detected. The boundary of an object is measured for each time band for the detected object 2730, and a rearward vehicle can acquire movement information of the object 2730 by comparing the sizes and positions of the object boundary 2735 at a first time point and the object boundary 2736 at a second time point. For example, when the boundary of the object 2730 becomes small or moves up, it can be checked that the object 2730 is moving forward fast.

Figure 28:
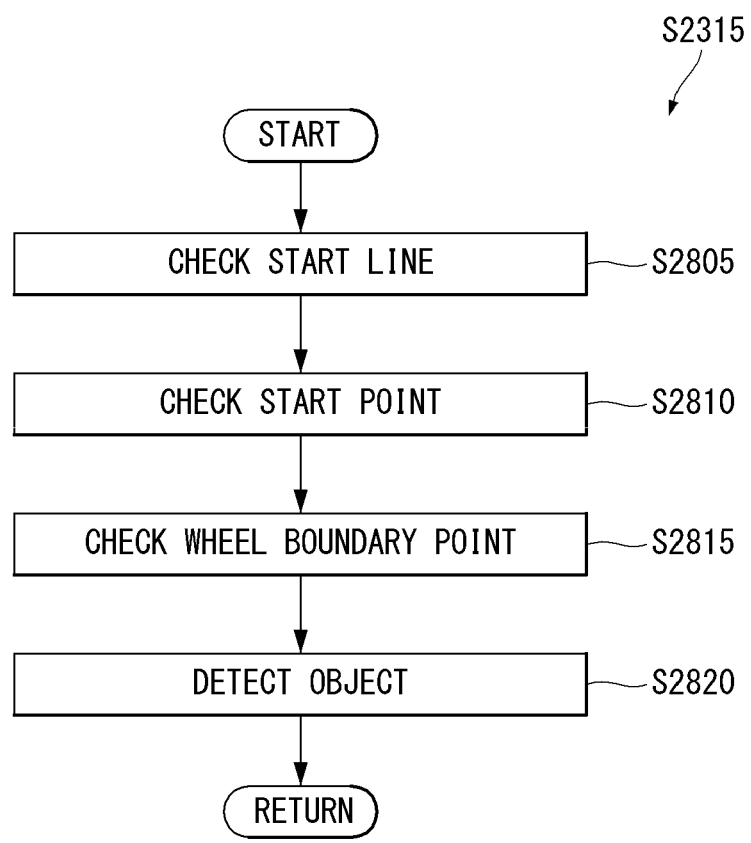
FIG. 28 shows another example of an operation flowchart of the third vehicle for detecting an object in an autonomous driving system according to an embodiment of the present disclosure.

FIG. 28 shows another example of an operation flowchart of the third vehicle for detecting an object in an autonomous driving system according to an embodiment of the present disclosure. FIG. 28 shows an example of step S2315 of FIG. 23.

In step S2805, the third vehicle 1210-3 can check a start line horizontally extending from the bottom of the rear side of a forward vehicle positioned forward. For example, in FIG. 29, a start line 2940 horizontally extending from the rear end 2937 of the vehicle M+3 (1210-M3) can be checked.

In step S2810, the third vehicle 1210-3 can check a start point that is the point where the start line and a sidewalk boundary meet. For example in FIG. 29, a point P0(*t*) where the start line 2940 and a sidewalk boundary 2946 that is a line close to a vehicle from a boundary 2945 of the sidewalk that is the boundary of the sidewalk 2950 meet is checked as a start point.

In step S2815, the third vehicle 1210-3 checks a wheel boundary point where a line connecting wheel boundaries of a vehicle and the start line meet. For example, in FIG. 29, a point P1(*t*) where a line 2928 connecting wheel boundaries 2922 and 2934 of the vehicle M+2 (1210-M2) and the start line 2940 meet.

In step S2820, the third vehicle 1210-3 can check an object existing between the wheel boundary point close to the start point and the start point. For example, an object 2960 positioned between wheel boundary points P1(*t*) and P0(*t*).

Figure 29:
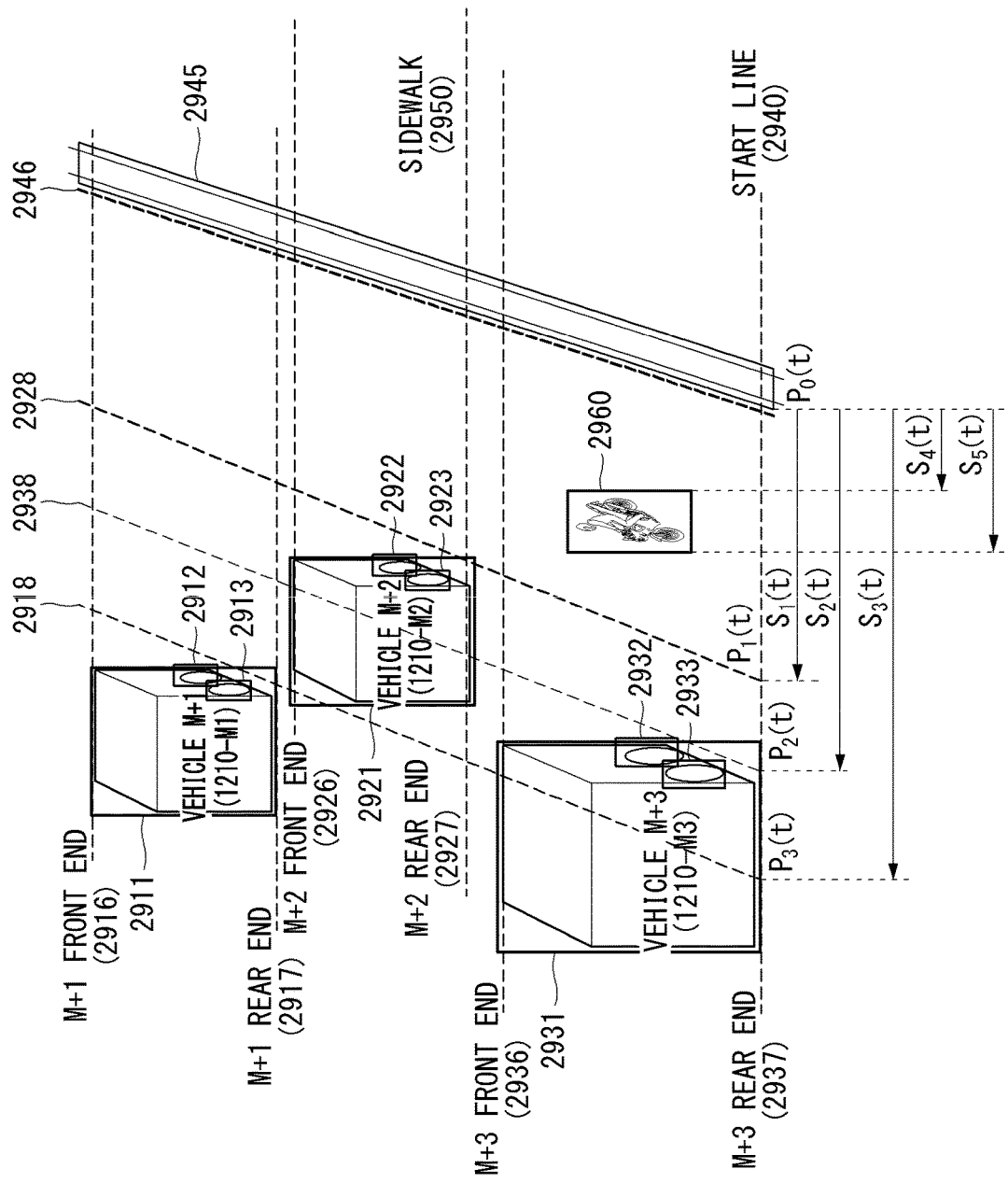
FIG. 29 shows another example of detecting an object moving between a vehicle and a sidewalk in an autonomous driving system according to an embodiment of the present disclosure.

FIG. 29 shows another example of detecting an object moving between a vehicle and a sidewalk in an autonomous driving system according to an embodiment of the present disclosure.

In FIG. 29, in an image generated by a camera of a rearward vehicle positioned rearward, boundaries 2911, 2921, and 2931 of a vehicle M+1 (1210-M1), a vehicle M+2 (1210-M2), and a vehicle M+3 (1210-M3), respectively, and wheel boundaries 2912, 2913, 2922, 2923, 2932, and 2933 of the wheels of the vehicles, respectively, are checked. Further, the boundary 2945 of the sidewalk 2950 is checked.

A line extending from the lower end of the boundary 2931 of the vehicle M+3 (1210-M3) positioned closest to the rearward vehicle of vehicles positioned forward is defined as the start line 2940. The point where the start line 2940 and a vehicle-side line 2946 of the sidewalk boundary 2945 meet is defined as a start point P0(*t*), and points where lines 2918, 2928, and 2938 connecting the wheel boundaries of vehicles, respectively, and the start line 2940 meet are determined as wheel boundary points P1(*t*), P2(*t*), and P3(*t*). The distances between the start point P0(*t*) and the wheel boundary points P1(*t*), P2(*t*), and P3(*t*) are defined as S1(*t*), S2(*t*), and S3(*t*). P1(*t*) that is a point that is the most adjacent to the sidewalk 2950 of the wheel boundary points P1(*t*), P2(*t*), and P3(*t*) is determined, and whether the boundary 2960 of an object exists between the wheel boundary point P1(*t*) that is the most adjacent to the sidewalk 2950 and the start point 2940 can be determined. When the object boundary 2960 exists between the wheel boundary point P1(*t*) and the start point P0(*t*), the distances S4(*t*) and S5(*t*) between the start point P0(*t*) and both ends of the object boundary 2960 can be shared as position information of the object among the vehicles in the platoon. When an object is determined, the forward vehicles can perform additional object detection operation and object block operation.

Figure 30:
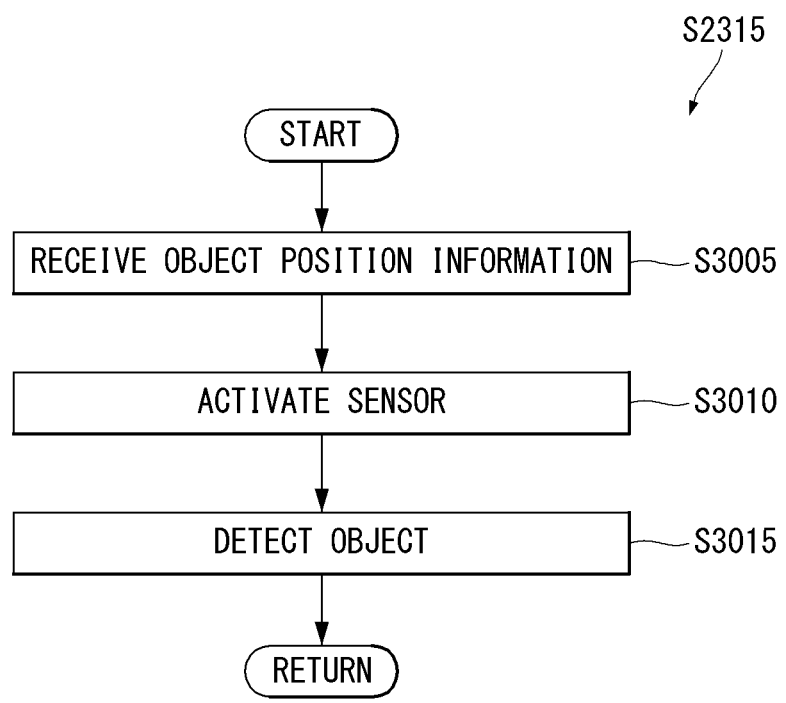
FIG. 30 shows another example of an operation flowchart of the third vehicle for detecting an object in an autonomous driving system according to an embodiment of the present disclosure.

FIG. 30 shows another example of an operation flowchart of the third vehicle for detecting an object in an autonomous driving system according to an embodiment of the present disclosure. FIG. 30 shows an example of step S2315 of FIG. 23.

In step S3005, the third vehicle 1210-3 can receive a message including the position of an object from a rearward vehicle positioned rearward in the platoon. For example, in FIG. 31, information about the position of an object 3610 positioned in an area I (3133) from a rearward vehicle.

In step S3010, the third vehicle 1210-3 can activate a sensor for detecting an object in correspondence to reception of the message including the position of an object. For example, the sensor for detecting an object may include a camera, a lidar, and a radar.

In step S3015, the third vehicle 1210-3 can detect an object through the sensor. For example, when an object 3160 of FIG. 31 is positioned in an area E (3122) by moving fast, the object 3160 can be detected by a side radar of the vehicle M+2 (2910-M2).

Figure 31:
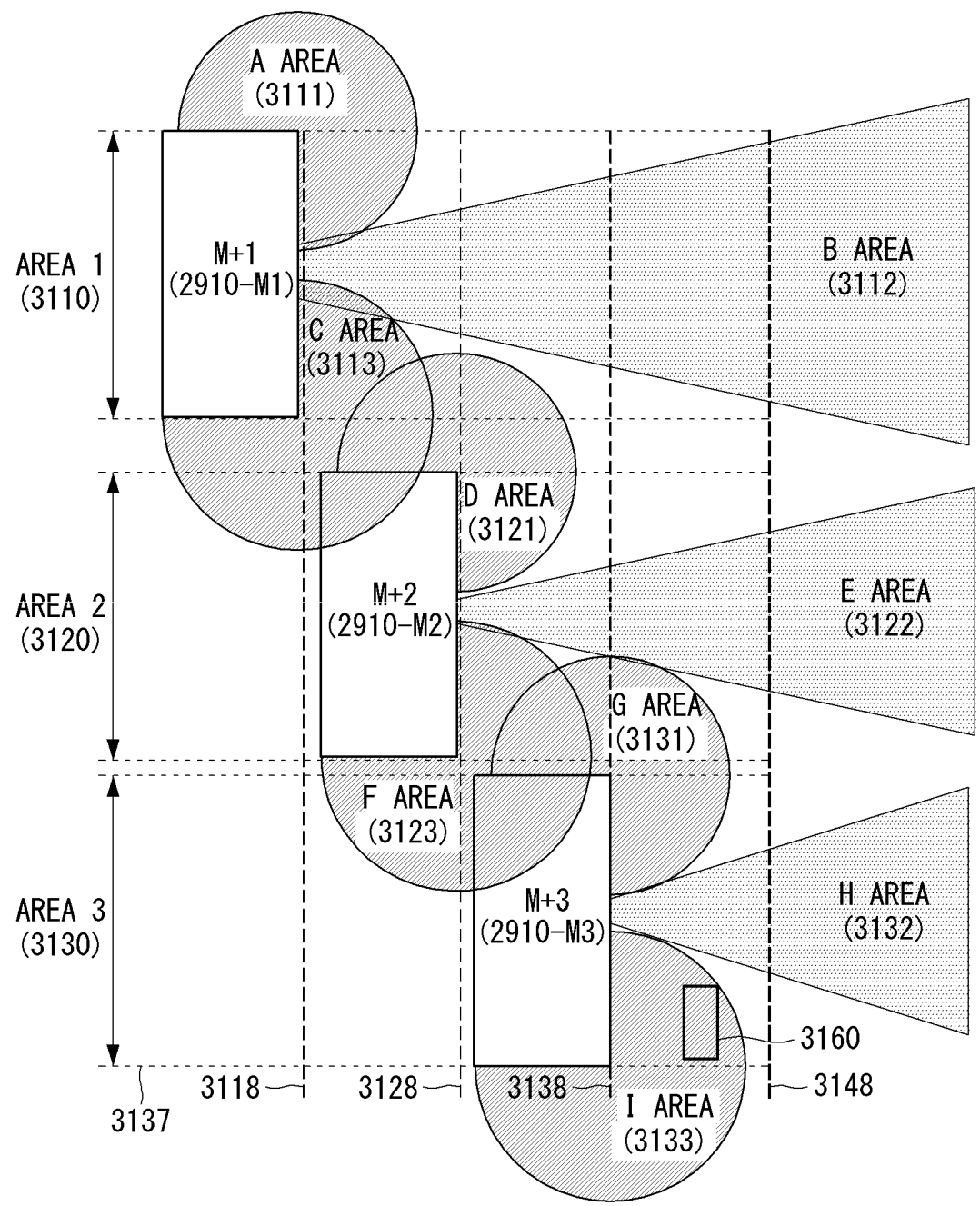
FIG. 31 shows another example of detecting an object moving between a vehicle and a sidewalk in an autonomous driving system according to an embodiment of the present disclosure.

FIG. 31 shows another example of detecting an object moving between a vehicle and a sidewalk in an autonomous driving system according to an embodiment of the present disclosure.

In FIG. 31, when an object 3160 between right boundaries 3118, 3128, and 3138 of vehicles and a sidewalk boundary 3148 is detected by a vehicle positioned rearward, a vehicle M+1 (2910-M1), a vehicle M+2 (2910-M2), and a vehicle M+3 (2910-M3) that are vehicles positioned forward activate sensors at the sides where the object has been detected, and the position, the speed, and the acceleration of the object 3160 can be measured in areas 3111, 3112, 3113, 3121, 3122, 3123, 3131, 3132, and 3133 that are sensed by sensors, respectively. For example, when it is detected that the object 3160 is positioned ahead of the start line 3137 corresponding to the rear are of the vehicle M+3 (2910-M3) by a rear vehicle, the object 3160 can be detected in the area I (3133) that is sensed by a lidar installed on the right rear of the vehicle M+3 (2910-M3).

Figure 32:
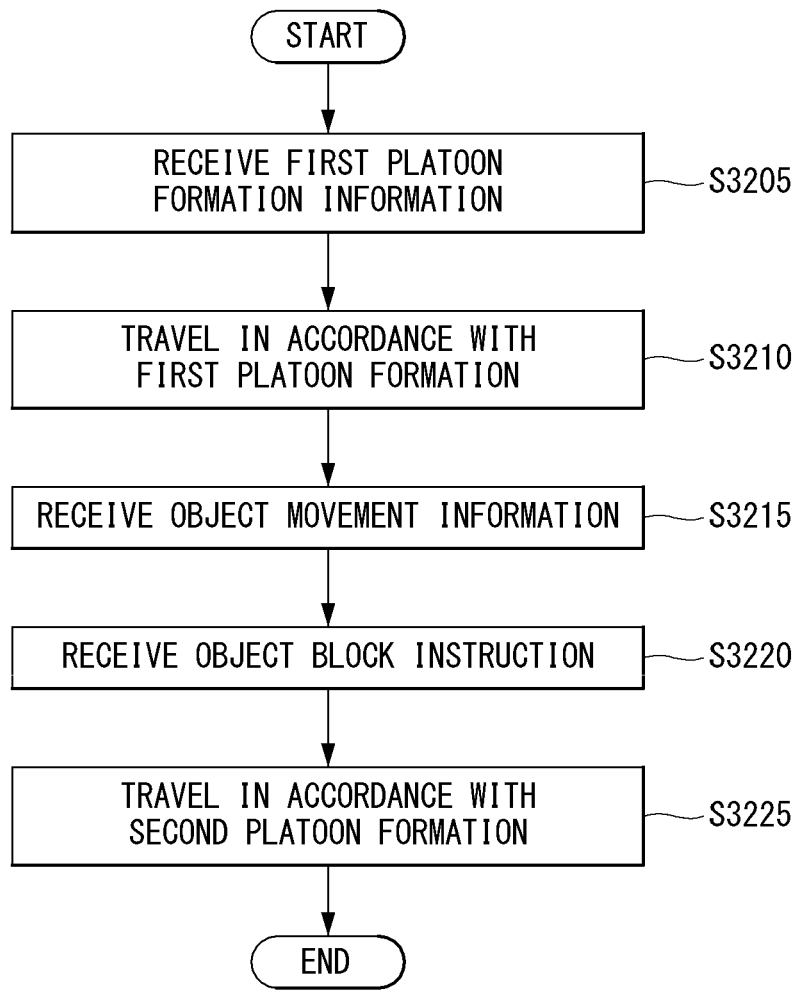
FIG. 32 shows an example of an operation flowchart of a second vehicle that prevents intrusion of an object from a first vehicle that transports passengers in an autonomous driving system according to an embodiment of the present disclosure.

FIG. 32 shows an example of an operation flowchart of a second vehicle that prevents intrusion of an object from a first vehicle that transports passengers in an autonomous driving system according to an embodiment of the present disclosure.

In step S3205, the second vehicle 1210-2 can receive information about the first platoon information from the first vehicle 1210-1 that transports passengers. The vehicles that receive the information about the first platoon formation from the first vehicle 1210-1 can travel in a platoon with the first vehicle 1210-1.

In step S3210, the third second 1210-2 travels in accordance with the first platoon formation. The second vehicle 1210-2 can monitor whether there is an object moving like a motorcycle adjacent to the platoon while traveling behind the first vehicle 1210-1.

In step S3215, the second vehicle 1210-2 can receive movement information of the object moving adjacent to the lane in which the vehicles forming the platoon travel. The movement information of the object may include the position, the speed, and the acceleration of the object, and the movement information of the object can be shared among the vehicles in the platoon through V2X communication.

In step S3220, the second vehicle 1210-2 can receive an object block instruction message, which gives an instruction to change the platoon formation into a second platoon formation such that some vehicles in the platoon move toward the sidewalk, from the first vehicle 1210-1. In another embodiment of the present disclosure, the second vehicle 1210-2 can enter toward the sidewalk even without receiving the object block instruction message when it is detected that an object moves between a bus and the sidewalk.

In step S3225, the second vehicle 1210-2 travels in accordance with the second platoon formation. That is, the second vehicle 1210-2 can approach the sidewalk such that the object cannot enter between the bus and the sidewalk.

Figure 33:
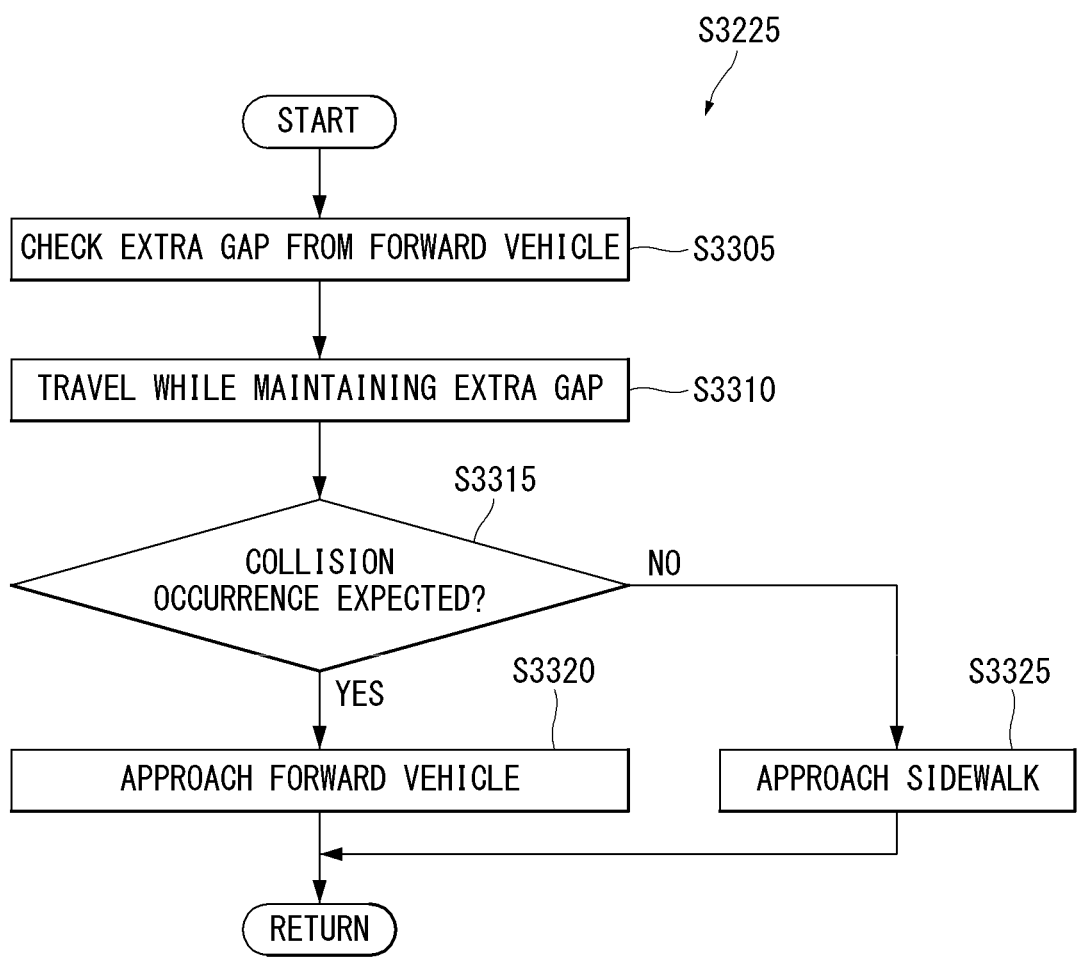
FIG. 33 shows an example of an operation flowchart of the second vehicle for preventing entry of an object in an autonomous driving system according to an embodiment of the present disclosure.

FIG. 33 shows an example of an operation flowchart of the second vehicle for preventing entry of an object in an autonomous driving system according to an embodiment of the present disclosure. FIG. 33 shows an example of step S3225 of FIG. 32.

In step S3305, the second vehicle 1210-2 checks an extra gap from a forward vehicle positioned ahead of the second vehicle 1210-2 that is required for the second vehicle 1210-2 to approach within a block distance with respect to the sidewalk. For example, the second vehicle 1210-2 can check a minimum extra gap from a forward vehicle that is required to steer toward the sidewalk.

In step S3310, the second vehicle 1210-2 travels while maintaining a distance over the extra gap with respect to the forward vehicle. That is, the second vehicle 1210-2 secures an extra gap to approach the sidewalk.

In step 3315, the second vehicle 1210-2 determines whether a collision with an object is expected, when the second vehicle 1210-2 approaches within a block distance from the sidewalk. When the second vehicle 1210-2 approaches within a block distance from the sidewalk, the second vehicle 1210-2 can determine whether a collision is expected, by comparing the position of the second vehicle 1210-2 and the position of the object.

In step S3320, when a collision with the object is expected, the second vehicle 1210-2 can approach within the spare gap toward the forward vehicle with the distance from the sidewalk maintained. That is, the second vehicle 1210-2 does not need to approach the sidewalk in order to avoid a collision with the object, so the second vehicle 1210-2 has only to travel while maintaining the minimum gap without maintaining the spare gap for turning from the forward vehicle.

In step S3325, when a collision with the object is not expected, the second vehicle 1210-2 approaches within the block distance with respect to the sidewalk. The second vehicle 1210-2 approaches within a block distance smaller than the width of the object toward the sidewalk, thereby being capable of preventing the object from moving between the bus and the sidewalk.

Figure 34:
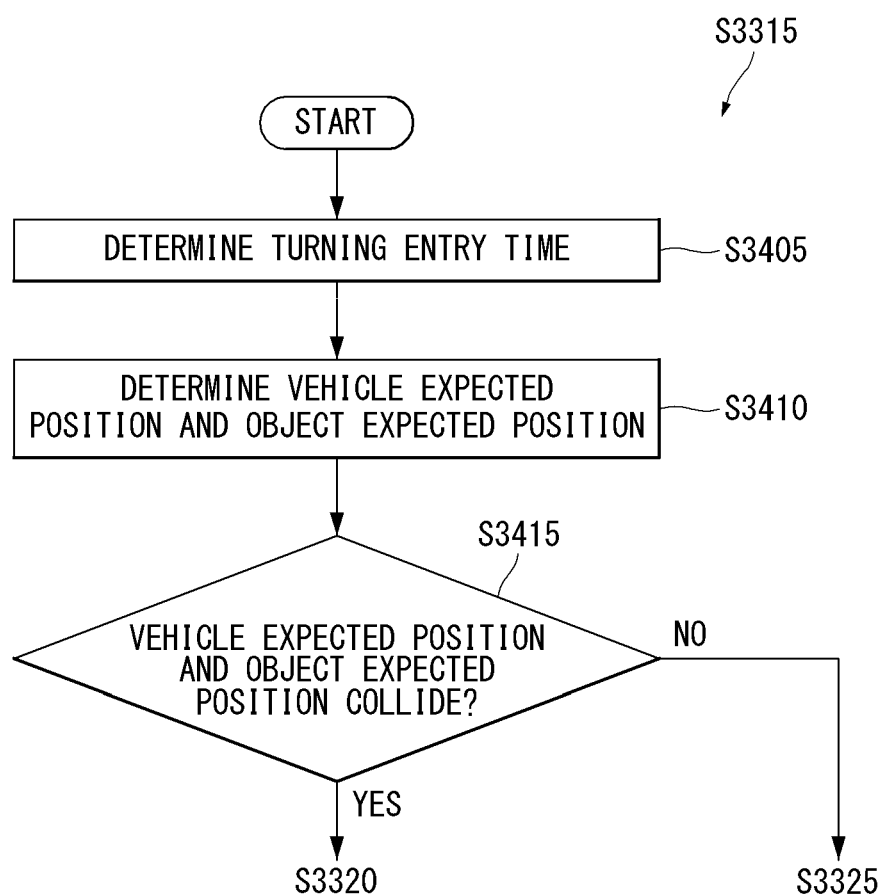
FIG. 34 shows an example of an operation flowchart of the second vehicle for determining whether a collision with an object is generated in an autonomous driving system according to an embodiment of the present disclosure.

FIG. 34 shows an example of an operation flowchart of the second vehicle for determining whether a collision with an object is generated in an autonomous driving system according to an embodiment of the present disclosure. FIG. 34 shows an example of step S3315 of FIG. 33.

In step 3315, the second vehicle 1210-2 determines a turning entry time required for the second vehicle 1210-2 to approach within a block distance with respect to the sidewalk. The second vehicle 1210-2 can calculate time (turning entry time) that is expected to move from the current position to a position when it approaches within a block distance with respect to the sidewalk in consideration of the current speed and turning angle of the second vehicle 1210-2.

In step S3410, the second vehicle 1210-2 determines an expected position of the second vehicle 1210-2 after the turning entry time and an expected position of the object after the turning entry time. For example, the second vehicle 1210-2 can calculate an expected position of the second vehicle 1210-2 after the turning entry time calculated in step S3405 and an expected position of the object considering the speed of the object.

In step S3415, the second vehicle 1210-2 can determine whether there is a possibility of a collision on the basis of the expected position of the second vehicle 1210-2 and the expected position of the object. For example, when the expected position of the second vehicle 1210-2 and the expected position of the object after the turning entry time overlap each other, it can be expected that a collision will occur.

Figure 35:
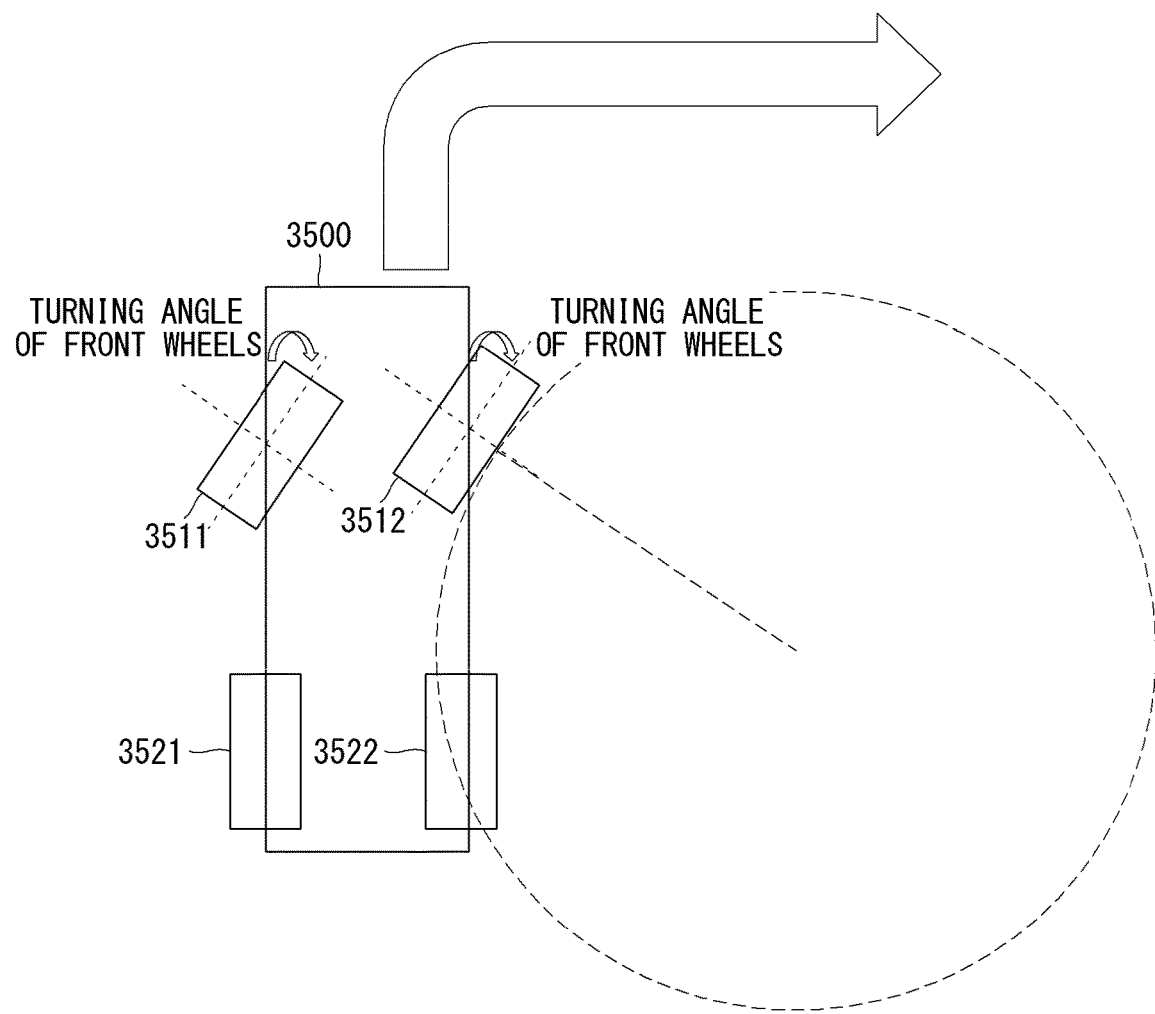
FIG. 35 shows an example of determining an expected position in consideration of turning of the front wheels of a vehicle in an autonomous driving system according to an embodiment of the present disclosure.

FIG. 35 shows an example of determining an estimated position in consideration of turning of the front wheels of a vehicle in an autonomous driving system according to an embodiment of the present disclosure.

Referring to FIG. 35, when a vehicle 3500 is steered to the right to approach the sidewalk, the distance that the body of the vehicle moves in accordance with the curvature of the front wheels 3511 and 2512 due to steering. Further, time required for the vehicle to move toward the sidewalk to block an object is calculated as in the following Formula 1 in consideration of the speed Vi(t) of the vehicle.

$$T_i(t) = \frac{L_i(t)}{V_i(t)} \quad \text{[Formula 1]}$$

In Formula 1, Li(t) is an expected movement distance when a vehicle is steered toward a sidewalk, the Vi(t) is the speed of a vehicle, i is the index of a vehicle, and t is time.

FIG. 35 shows an example in which steering is performed by the front wheels 3511 and 3512, but a similar method can be applied even to a case when steering is performed by the rear wheels 3521 and 3522.

Figure 36:
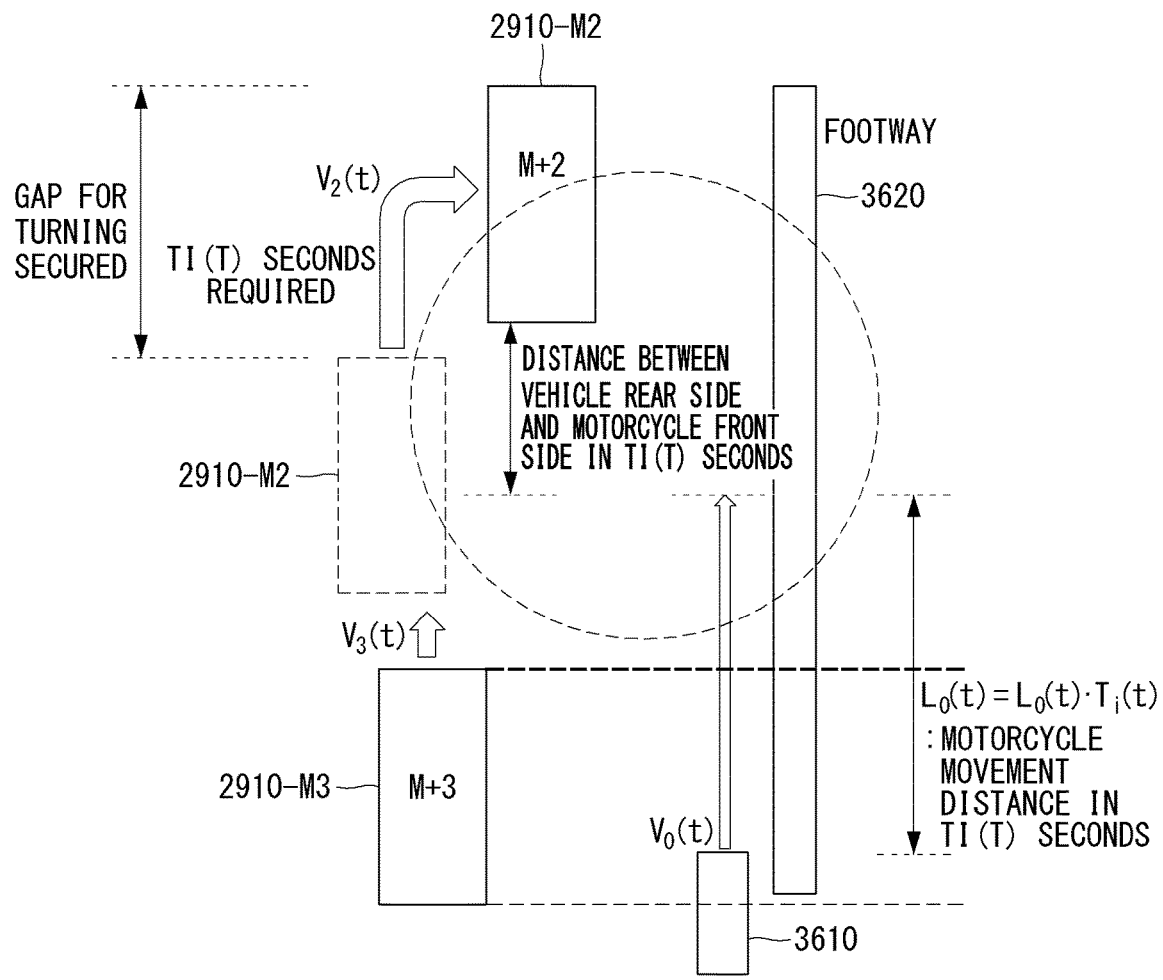
FIG. 36 shows an example of determining a collision occurrence possibility between a vehicle and an object in an autonomous driving system according to an embodiment of the present disclosure.

FIG. 36 shows an example of determining a collision occurrence possibility between a vehicle and an object in an autonomous driving system according to an embodiment of the present disclosure.

In FIG. 36, a vehicle 2910-M3 that detects an object measures the position, the speed, and the acceleration of the object 3610 detected adjacent to the sidewalk 6320 using sensors (a right rear lidar, a right radar, and a left rear lidar) installed on a side of the vehicle while traveling at a speed of V3(t). Thereafter, the position, the speed, and the acceleration of the object are broadcasted among the vehicles in the platoon through V2X communication, and the vehicles in the platoon can calculate the speed V0(t) of the object from object movement information shared among the vehicles in the platoon.

The vehicles included in the platoon each calculate a gap required for turning to block the object 3610. In FIG. 36, the vehicle M+2 (2910-M2) calculates the gap from a forward vehicle that is required for turning when approaching toward the sidewalk, and secures the gap from the forward vehicle by considering what vehicle number it is from the vehicle M+1 that passengers board/alight on/from.

The vehicles within a safe distance that is a distance through which the object 3610 does not reach the start point of a passenger boarding/alighting section with the total expected time Ttotal that passengers take to board/alight starts an operation of turning and entering toward the sidewalk. A vehicle that the object passes by a side for time Ti(t) of the turning entry operation stops turning and broadcasts movement information (speed, acceleration, and position) of the object together with a message that is used for V2X communication.

When calculating the distance between the rear side position after Ti(t) from the time when the vehicle M+2 (2910-M2) started turning entry and the object front side position after Ti(t) from the time when the vehicle started turning entry, if there is no collision, the vehicle M+2 (2910-M2) can serve as a blocker by starting turning entry.

Figure 37:
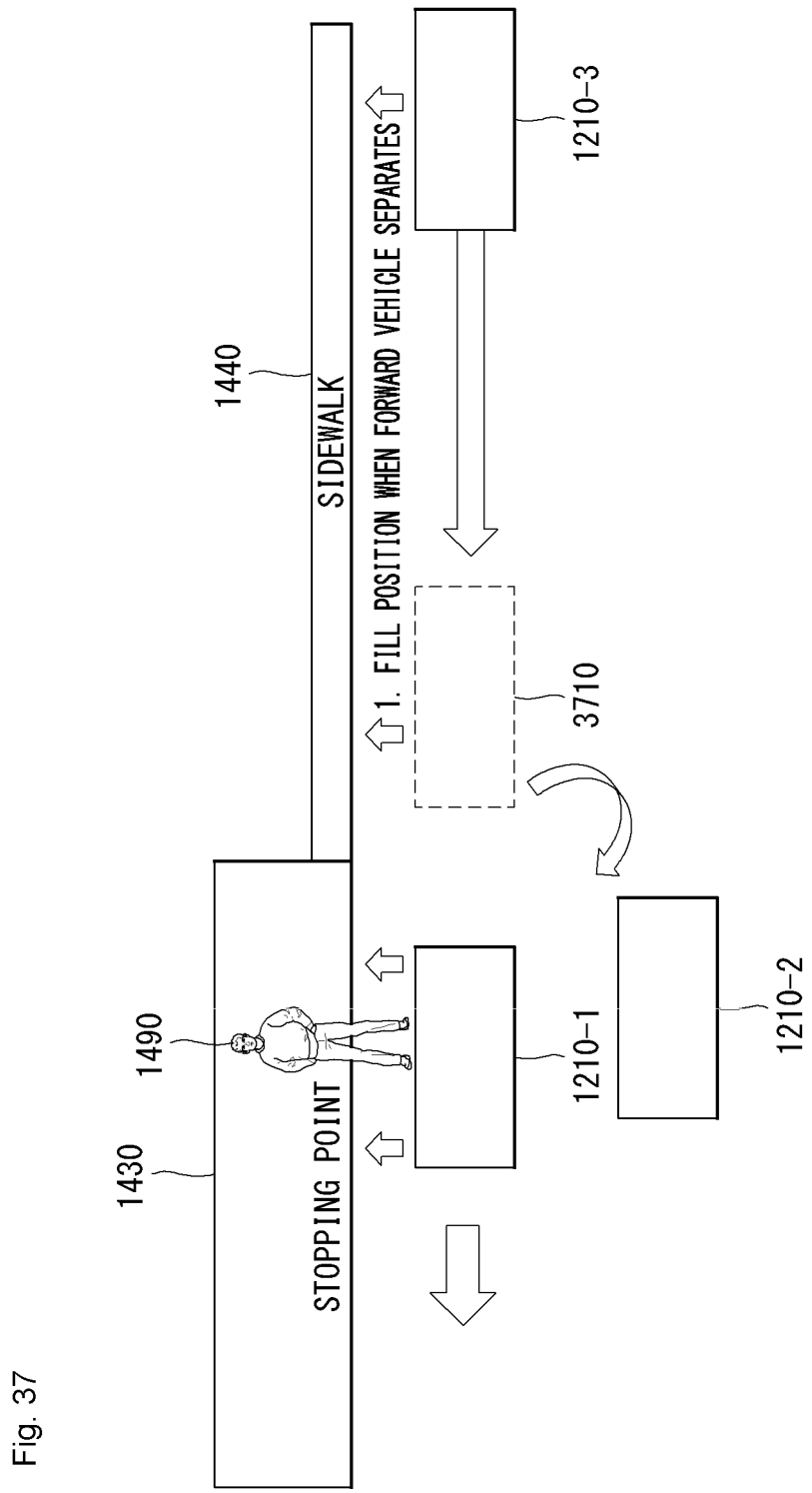
FIG. 37 shows an example of resetting a platoon formation when a vehicle separates from a platoon in an autonomous driving system according to an embodiment of the present disclosure.

FIG. 37 shows an example of resetting a platoon formation when a vehicle separates from a platoon in an autonomous driving system according to an embodiment of the present disclosure.

In FIG. 37, when a vehicle positioned in the middle of a platoon line while a plurality of vehicles travel in a platoon separates, the rearward vehicle positioned behind the separation position moves to the position of the separating vehicle, thereby being capable of maintaining the inter-vehicle gap.

Figure 38:
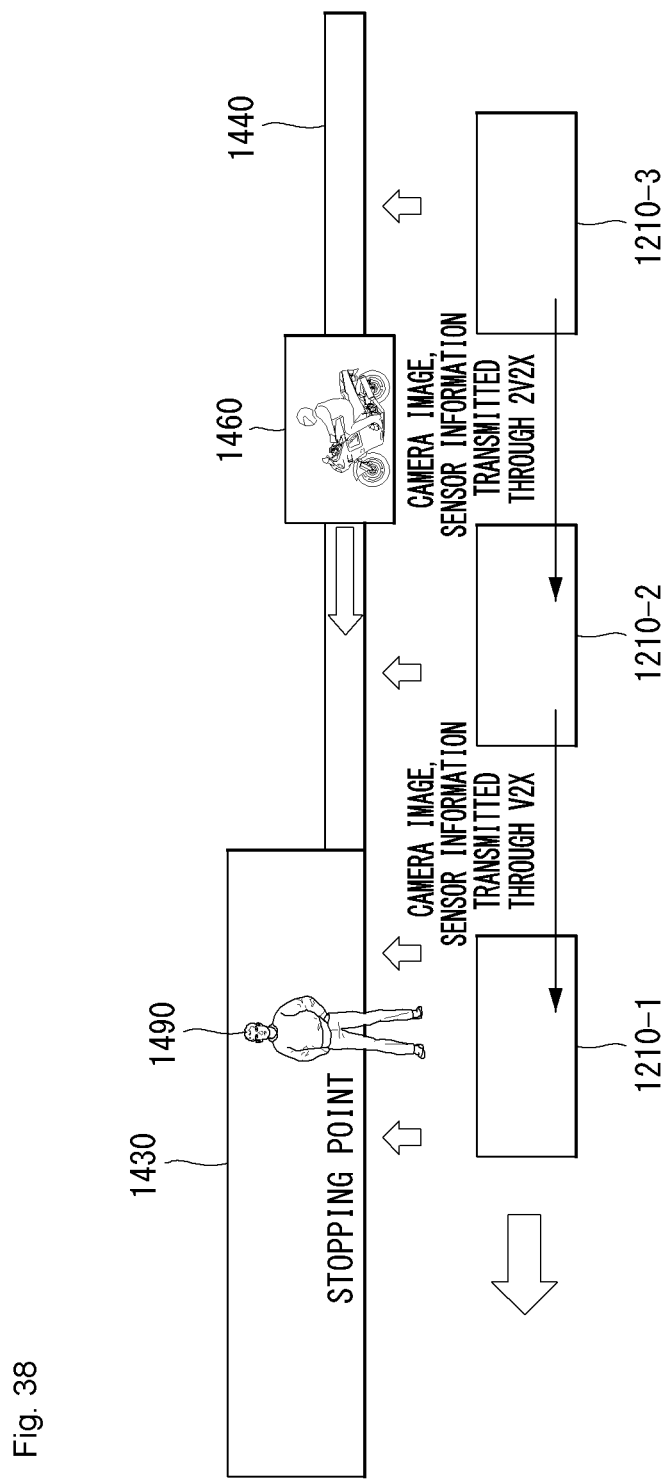
FIG. 38 shows an example when object sensing information is transmitted from an autonomous driving system according to an embodiment of the present disclosure.

FIG. 38 shows an example when object sensing information is transmitted from an autonomous driving system according to an embodiment of the present disclosure.

In FIG. 38, vehicles 1210-1, 1210-2, and 1210-3 included in the platoon can share an image taken by a camera or sensing information of the object 1460 through V2X communication. The rearward vehicles 1210-1 and 1210-2 approaches the sidewalk 1440 on the basis of the sensing information of the object 1460, whereby it is possible to the object 1460 from colliding with a passenger 1490 adjacent to a stopping position 1430.

Hereafter, various embodiments for controlling a vehicle in an autonomous driving system according to an embodiment of the present disclosure are described.

Embodiment 1: A method of controlling a first vehicle that transports passengers in an autonomous driving system that controls platooning includes: receiving boarding/alighting information of the passengers from a server; determining a first platoon formation of platoon vehicles that travel in the same lane in a platoon on the basis of the boarding/alighting information; transmitting information about the first platoon formation to other vehicles included in the platoon; checking an object moving adjacent to the lane; and transmitting an object block instruction message, which changes the platoon formation into a second platoon formation such that a block distance between at least one vehicle included in the platoon and a sidewalk becomes smaller than a width of the object, to other vehicles included in the platoon.

Embodiment 2: In the embodiment 1, the boarding/alighting information may include a stopping position, the number of passengers who board or alight at the stopping position, and an expected time required for boarding or alighting at the stopping position.

Embodiment 3: In the embodiment 2, the determining of a first platoon formation may include: checking an expected stop time of each of the vehicles included in a platoon at the stopping position; determining order with respect to positions of the vehicles included in the platoon on the basis of the expected stop time of each of the vehicles included in the platoon; and determining the first platoon formation on the basis of the order.

Embodiment 4: In the embodiment 1, the object corresponds to an object that has a predetermined size and can move, and the checking of an object may include: receiving first object movement information about movement of the object in a first area that is a surrounding area of a second vehicle from the second vehicle traveling behind the first vehicle; receiving second object movement information about movement of the object in a second area that is a surrounding area of a third vehicle from the third vehicle traveling behind the second vehicle; and checking continuous movement of the object in the first area and the second area on the basis of the first object movement information and the second object movement information.

Embodiment 5: A method of controlling a second vehicle that prevent intrusion of an object from a first vehicle that transports passengers in an autonomous driving system that controls platooning includes: receiving information about a first platoon formation of platoon vehicle traveling in a platoon in the same lane from a first vehicle; traveling in accordance with the first platoon formation; receiving movement information of an object moving adjacent to the lane from a third vehicle traveling behind the second vehicle in the platoon; receiving an object block instruction message, which changes the platoon formation into a second platoon formation such that a block distance between at least one vehicle included in the platoon and a sidewalk becomes smaller than a width of the object, from the first vehicle; and traveling in accordance with the second platoon formation.

Embodiment 6: In the embodiment 5, the object may correspond to an object that has a predetermined size and can move.

Embodiment 7: In the embodiment 5, the movement information of the object may be shared among the vehicles included in the platoon through V2X (vehicle-to-everything) communication.

Embodiment 8: In the embodiment 5, the movement information of the object may include a position, a movement speed, acceleration of the object in each of sub-areas divided from an area around the third vehicle.

Embodiment 9: In the embodiment 5, the traveling in accordance with the second platoon formation may include approaching toward the sidewalk to maintain a block distance smaller than the width of the object with respect to the sidewalk in correspondence to the object block instruction message.

Embodiment 10: In the embodiment 5, the traveling in accordance with the second platoon formation may include: determining an extra gap from a forward vehicle positioned ahead of the second vehicle that is required for the second vehicle to approach within a block distance with respect to the sidewalk; traveling while maintaining a distance over the extra gap with respect to the forward vehicle; determining whether a collision with the object is expected, when the vehicle approaches within a block distance from the sidewalk; approaching within the spare gap toward the forward vehicle with the distance from the sidewalk maintained when a collision with the object is expected; and approaching within the block distance with respect to the sidewalk when a collision with the object is not expected.

Embodiment 11: In the embodiment 10, the determining of whether there is a possibility of a collision with the object may include: determining a turning entry time required for the second vehicle to approach within the block distance with respect to the sidewalk; determining an expected position of the vehicle after the turning entry time and an expected position of the object after the turning entry time; and determining whether there is a possibility of a collision on the basis of the expected position of the vehicle and the expected position of the object.

Embodiment 12: A method of controlling a third vehicle that provides object sensing information to a first vehicle that transports passengers and a second vehicle that assists boarding/alighting of the passengers of the first vehicle in an autonomous driving system that controls platooning, includes: receiving information about a first platoon formation of platoon vehicle traveling in a platoon in the same lane from the first vehicle; traveling in accordance with the first platoon formation; detecting an object moving adjacent to the lane; transmitting movement information of the object to other vehicles included in the platoon; receiving an object block instruction message, which changes the platoon formation into a second platoon formation such that a block distance between at least one vehicle included in the platoon and a sidewalk becomes smaller than a width of the object, from the first vehicle; and traveling in accordance with the second platoon formation.

Embodiment 13: In the embodiment 12, the object may correspond to an object that has a predetermined size and can move, the movement information of the object may include motion sensing information of the vehicle and image data of the object acquired by a camera of the vehicle, and the motion sensing information may include a position, a speed, and acceleration of the object.

Embodiment 14: In the embodiment 12, the movement information of the object may be shared among the platoon vehicles through V2X (vehicle-to-everything) communication.

Embodiment 15: In the embodiment 12, the movement information of the object may include a position, a movement speed, acceleration of the object in each of sub-areas divided from an area around the third vehicle.

Embodiment 16: In the embodiment 12, the detecting of an object may include: checking a sidewalk boundary of the a sidewalk adjacent to the lane; checking a vehicle side boundary that is a side boundary of the vehicle; and checking the object moving between the sidewalk boundary and the vehicle side boundary.

Embodiment 17: In the embodiment 12, the detecting of an object may include: acquiring an image including a forward vehicle positioned ahead of the third vehicle and a sidewalk adjacent to the lane; checking a sidewalk boundary that is a boundary of the sidewalk adjacent to the lane in the image; checking a vehicle boundary that is a boundary of the forward vehicle in the image; and detecting movement of the object between the vehicle boundary of the forward vehicle and the sidewalk boundary.

Embodiment 18: In the embodiment 12, the detecting of an object may include: acquiring an image including at least one forward vehicle positioned ahead of the third vehicle of the platoon vehicles and a sidewalk adjacent to the lane; checking a sidewalk boundary that is a boundary of the sidewalk adjacent to the lane in the image; and checking movement of the object between the sidewalk boundary and wheel boundaries that are boundaries of wheels of the at least one forward vehicle.

Embodiment 19: In the embodiment 18, the checking of movement of the object may include: checking a start line horizontally extending from a bottom of a rear side of a first forward vehicle positioned right ahead of the third vehicle; checking a start point where the start line and the sidewalk boundary meet; checking at least one wheel boundary point where a line connecting wheel boundaries of at least one vehicle and the start line meet; and detecting the object existing between a wheel point, which is close to the start point of the at least one wheel boundary point, and the start point.

Embodiment 20: In the embodiment 12, the detecting of an object may include: receiving a message including a position of the object from a rearward vehicle positioned behind the third vehicle in the platoon; activating at least one sensor for sensing a surrounding area of the third vehicle in correspondence to reception of the message; and detecting the object moving in the surrounding area through the at least one sensor.

Embodiment 21: An apparatus for controlling a first vehicle that transports passengers of a plurality of vehicles in an autonomous driving system in which the vehicles travel in a platoon, includes: a sensing unit that generates sensing information around the first vehicle; a processor that is combined with the sensing unit and controls functions of the first vehicle; a transceiver that is combined with the processor and transmits or receives a signal; and a storage that is combined with the processor and stores data processed by the processor, in which the processor is set to receive boarding/alighting information of the passengers from a server through the transceiver, to determine a first platoon formation in which vehicles included in the platoon travel in the same lane as the first vehicle on the basis of the boarding/alighting information, to transmit information about the first platoon formation to other vehicles included in the platoon through the transceiver, to check an object moving adjacent to the lane, and to transmit an object block instruction message, which changes the platoon formation into a second platoon formation such that a block distance between at least one vehicle included in the platoon and a sidewalk becomes smaller than a width of the object, to other vehicles included in the platoon through the transceiver.

Embodiment 22: In the embodiment 21, the boarding/alighting information may include a stopping position, the number of passengers who board or alight at the stopping position, and an expected time required for boarding or alighting at the stopping position.

Embodiment 23: In the embodiment 21, the processor may be set to check an expected stop time of each of the vehicles included in a platoon at the stopping position, to determine order with respect to positions of the vehicles included in the platoon on the basis of the expected stop time of each of the vehicles included in the platoon, and to determine the first platoon formation on the basis of the order.

Embodiment 24: In the embodiment 21, the processor may be set to receive first object movement information about movement of the object in a first area that is a surrounding area of a second vehicle from the second vehicle through the transceiver, to receive second object movement information about movement of the object in a second area that is a surrounding area of a third vehicle from the third vehicle through the transceiver; and to check continuous movement of the object in the first area and the second area on the basis of the first object movement information and the second object movement information.

Embodiment 25: An apparatus for controlling a second vehicle to prevent intrusion of an object from a first vehicle that transports passengers in an autonomous driving system in which a plurality of forms a platoon, includes: a sensing unit that generates sensing information around the first vehicle; a processor that is combined with the sensing unit and controls functions of the second vehicle; a transceiver that is combined with the processor and transmits or receives a signal; and a storage that is combined with the processor and stores data processed by the processor, in which the processor receives information about a first platoon formation, in which vehicles included in the platoon travel in the same lane, from the first vehicle through the transceiver; travels in accordance with the first platoon formation, receives movement information of an object moving adjacent to the lane from the third vehicle in the platoon, receives an object block instruction message, which changes the platoon formation into a second platoon formation such that a block distance between at least one vehicle included in the platoon and a sidewalk becomes smaller than a width of the object, from the first vehicle, and controls the second vehicle to travel in accordance with the second platoon formation.

Embodiment 26: In the embodiment 25, the movement information of the object may include a position, a speed, and acceleration of the object.

Embodiment 27: In the embodiment 25, the movement information of the object may be shared among the vehicles included in the platoon through V2X (vehicle-to-everything) communication.

Embodiment 28: In the embodiment 25, the movement information of the object may include a position, a movement speed, acceleration of the object in each of sub-areas divided from an area around the third vehicle.

Embodiment 29: In the embodiment 25, the processor may control the second vehicle to approach toward the sidewalk to maintain a block distance smaller than the width of the object with respect to the sidewalk in correspondence to the object block instruction message.

Embodiment 30: In the embodiment 25, the processor may: determine an extra gap from a forward vehicle that is required for the second vehicle to approach within a block distance with respect to the sidewalk; travel while maintaining a distance over the extra gap with respect to the forward vehicle; determine whether a collision with the object is expected, when the vehicle approaches within a block distance from the sidewalk; control the second vehicle to approach within the spare gap toward the forward vehicle with the distance from the sidewalk maintained when a collision with the object is expected; and control the second vehicle to approach within the block distance with respect to the sidewalk when a collision with the object is not expected.

Embodiment 31: In the embodiment 30, the processor may: determine a turning entry time required for the second vehicle to approach within the block distance with respect to the sidewalk; determine an expected position of the vehicle after the turning entry time and an expected position of the object after the turning entry time; and determine whether there is a possibility of a collision on the basis of the expected position of the vehicle and the expected position of the object.

Embodiment 32: An apparatus for controlling a third vehicle in an autonomous driving system in which vehicles, which includes a first vehicle that transports passengers, a second vehicle traveling behind the first vehicle, and the third vehicle traveling behind the second vehicle, form a platoon, includes: a sensing unit that generates sensing information around the first vehicle; a processor that is combined with the sensing unit and controls functions of the third vehicle; a transceiver that is combined with the processor and transmits or receives a signal; and a storage that is combined with the processor and stores data processed by the processor, in which the processor is set to receive information about a first platoon formation, in which vehicles included in the platoon travel in the same lane, from the first vehicle through the transceiver, to control the third vehicle to travel in accordance with the first platoon formation, to detect an object moving adjacent to the lane, to transmit movement information of the object to other vehicles included in the platoon through the transceiver, to receive an object block instruction message, which changes the platoon formation into a second platoon formation such that a block distance between at least one vehicle included in the platoon and a sidewalk becomes smaller than a width of the object, from the first vehicle through the transceiver, and to control the third vehicle to travel in accordance with the second platoon formation.

Embodiment 33: In the embodiment 32, the movement information of the object may include motion sensing information of the vehicle and image data of the object acquired by a camera of the vehicle, and the motion sensing information may include a position, a speed, and acceleration of the object.

Embodiment 34: In the embodiment 32, the movement information of the object may be shared among the vehicles included in the platoon through V2X (vehicle-to-everything) communication.

Embodiment 35: In the embodiment 32, the movement information of the object may include a position, a movement speed, acceleration of the object in each of sub-areas divided from an area around the third vehicle.

Embodiment 36: In the embodiment 32, the processor may check a sidewalk boundary of the a sidewalk adjacent to the lane; check a vehicle side boundary that is a side boundary of the vehicle; and check the object moving between the sidewalk boundary and the vehicle side boundary.

Embodiment 37: In the embodiment 32, the processor may acquire an image including another vehicle positioned ahead of the third vehicle and a sidewalk adjacent to the lane; check a sidewalk boundary that is a boundary of the sidewalk adjacent to the lane in the image; check a vehicle boundary that is a boundary of the another vehicle in the image; and detecting movement of the object between the vehicle boundary of the forward vehicle and the sidewalk boundary.

Embodiment 38: In the embodiment 32, the processor may acquire an image including at least one forward vehicle positioned ahead of the third vehicle of the vehicles included in the platoon and a sidewalk adjacent to the lane; check a sidewalk boundary that is a boundary of the sidewalk adjacent to the lane in the image; check movement of the object between the sidewalk boundary and wheel boundaries that are boundaries of wheels of the at least one forward vehicle.

Embodiment 39: In the embodiment 38, the processor may check a start line horizontally extending from a bottom of a rear side of a first forward vehicle positioned right ahead of the third vehicle; check a start point where the start line and the sidewalk boundary meet; check at least one wheel boundary point where a line connecting wheel boundaries of at least one vehicle and the start line meet; and detect the object existing between a wheel point, which is close to the start point of the at least one wheel boundary point, and the start point.

Embodiment 40: In the embodiment 32, the processor may receive a message including a position of the object from a rearward vehicle positioned behind the third vehicle in the platoon; activate at least one sensor for sensing a surrounding area of the third vehicle in correspondence to reception of the message; and detect the object moving in the surrounding area through the at least one sensor.

Embodiment 41: An autonomous driving system includes a plurality of vehicles traveling in a platoon and a server providing data relates to traveling to the plurality of vehicles, in which the plurality of vehicles includes a first vehicle that transports passengers, a second vehicle that assist boarding/alighting of the passenger of the first vehicle, and a third vehicle the provides object sensing information to the first vehicle and the second vehicle; the first vehicle receives boarding/alighting information from the server, determines a first platoon formation in which vehicles included in the platoon travel in the same lane as the first vehicle on the basis of the boarding/alighting information, and checks an object moving adjacent to the lane; the object is checked on the basis of movement information of the object received from the second vehicle or the third vehicle, an object block instruction message, which changes the platoon formation into a second platoon formation such that a block distance between at least one vehicle included in the platoon and a sidewalk becomes smaller than a width of the object, is transmitted to other vehicles included in the platoon, and the vehicles included in the platoon travel in accordance with the second platoon formation.

Embodiment 42: In the embodiment 41, the boarding/alighting information may include a stopping position, the number of passengers who board or alight at the stopping position, and an expected time required for boarding or alighting at the stopping position.

Embodiment 43: In the embodiment 41, the first vehicle may check an expected stop time of each of the vehicles included in a platoon at the stopping position; determine order with respect to positions of the vehicles included in the platoon on the basis of the expected stop time of each of the vehicles included in the platoon; and determine the first platoon formation on the basis of the order.

Embodiment 44: In the embodiment 41, the first vehicle may receive first object movement information about movement of the object in a first area that is a surrounding area of a second vehicle from the second vehicle traveling behind the first vehicle through the transceiver, receive second object movement information about movement of the object in a second area that is a surrounding area of a third vehicle from the third vehicle traveling behind the second vehicle through the transceiver; and check continuous movement of the object in the first area and the second area on the basis of the first object movement information and the second object movement information.

Embodiment 45: In the embodiment 41, the movement information of the object may include a position, a speed, and acceleration of the object.

Embodiment 46: In the embodiment 41, the movement information of the object may be shared among the vehicles included in the platoon through V2X (vehicle-to-everything) communication.

Embodiment 47: In the embodiment 41, the movement information of the object may include a position, a movement speed, acceleration of the object in each of sub-areas divided from an area around the third vehicle or the second vehicle.

Embodiment 48: In the embodiment 41, the second vehicle may approach toward the sidewalk to maintain a block distance smaller than the width of the object with respect to the sidewalk in correspondence to the object block instruction message.

Embodiment 49: In the embodiment 41, the second vehicle may: determine an extra gap from a forward vehicle that is required for the second vehicle to approach within a block distance with respect to the sidewalk; travel while maintaining a distance over the extra gap with respect to the forward vehicle; determine whether a collision with the object is expected, when the second vehicle approaches within a block distance from the sidewalk; approach within the spare gap toward the forward vehicle with the distance from the sidewalk maintained when a collision with the object is expected; and approach within the block distance with respect to the sidewalk when a collision with the object is not expected.

Embodiment 50: In the embodiment 49, the second vehicle may: determine a turning entry time required for the second vehicle to approach within the block distance with respect to the sidewalk; determine an expected position of the vehicle after the turning entry time and an expected position of the object after the turning entry time; and determine whether there is a possibility of a collision on the basis of the expected position of the vehicle and the expected position of the object.

Embodiment 51: In the embodiment 41, the third may acquire an image including another vehicle positioned ahead of the third vehicle and a sidewalk adjacent to the lane; check a sidewalk boundary that is a boundary of the sidewalk adjacent to the lane in the image; check a vehicle boundary that is a boundary of the another vehicle in the image; and detecting movement of the object between the vehicle boundary of the forward vehicle and the sidewalk boundary.

Embodiment 52: In the embodiment 41, the third vehicle may acquire an image including at least one forward vehicle positioned ahead of the third vehicle of the vehicles included in the platoon and a sidewalk adjacent to the lane; check a sidewalk boundary that is a boundary of the sidewalk adjacent to the lane in the image; check movement of the object between the sidewalk boundary and wheel boundaries that are boundaries of wheels of the at least one forward vehicle.

Embodiment 53: In the embodiment 52, the third vehicle may check a start line horizontally extending from a bottom of a rear side of a first forward vehicle positioned right ahead of the third vehicle; check a start point where the start line and the sidewalk boundary meet; check at least one wheel boundary point where a line connecting wheel boundaries of at least one vehicle and the start line meet; and detect the object existing between a wheel point, which is close to the start point of the at least one wheel boundary point, and the start point.

Embodiment 54: In the embodiment 41, the third vehicle may receive a message including a position of the object from a rearward vehicle positioned behind the third vehicle in the platoon; activate at least one sensor for sensing a surrounding area of the third vehicle in correspondence to reception of the message; and detect the object moving in the surrounding area through the at least one sensor.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Effects of a method and apparatus for controlling a vehicle in an autonomous driving system according to an embodiment of the present disclosure are as follows.

The present disclosure can achieve a method and apparatus for controlling a vehicle that can provide an environment in which passengers can safely board on or alight from a vehicle in an autonomous driving system by determining a platoon formation that can prevent entry of an object in correspondence to detection of the object having a possibility of a collision with passengers.

The present disclosure can achieve a method and apparatus for controlling a vehicle that can detect an object having a possibility of a collision with passengers in an autonomous driving system by exchanging object sensing information among vehicles.

What is claimed is:

1. A method of controlling a first vehicle that transports passengers in an autonomous driving system that controls platooning, the method comprising:
   receiving boarding/alighting information of the passengers from a server;
   determining a first platoon formation of platooning vehicles that travel in the same lane in a platoon on the basis of the boarding/alighting information;
   transmitting information about the first platoon formation to other vehicles included in the platoon;
   detecting an object moving adjacent to the lane; and
   transmitting an object block instruction message, which changes the platoon formation into a second platoon formation such that a block distance between at least one vehicle included in the platoon and a sidewalk becomes smaller than a width of the object, to other vehicles included in the platoon.

2. The method of claim 1, wherein the boarding/alighting information includes a stopping position, the number of passengers who board or alight at the stopping position, or an expected time required for boarding or alighting at the stopping position.

3. The method of claim 2, wherein the determining of a first platoon formation includes:
   checking an expected stop time of each of the vehicles included in a platoon at the stopping position;
   determining order with respect to positions of the vehicles included in the platoon on the basis of the expected stop time of each of the vehicles included in the platoon; and
   determining the first platoon formation on the basis of the order.

4. The method of claim 1, wherein the object corresponds to an object that has a predetermined size and can move, and wherein the checking of an object includes:
   receiving first object movement information about movement of the object in a first area that is a surrounding area of a second vehicle from the second vehicle traveling behind the first vehicle;
   receiving second object movement information about movement of the object in a second area that is a surrounding area of a third vehicle from the third vehicle traveling behind the second vehicle; and
   checking continuous movement of the object in the first area and the second area on the basis of the first object movement information and the second object movement information.

5. A method of controlling a second vehicle that prevent intrusion of an object from a first vehicle that transports passengers in an autonomous driving system that controls platooning, the method comprising:
   receiving information about a first platoon formation of platoon vehicle traveling in a platoon in the same lane from a first vehicle;
   traveling in accordance with the first platoon formation;
   receiving movement information of an object moving adjacent to the lane from a third vehicle traveling behind the second vehicle in the platoon;
   receiving an object block instruction message, which changes the platoon formation into a second platoon formation such that a block distance between at least one vehicle included in the platoon and a sidewalk becomes smaller than a width of the object, from the first vehicle; and
   traveling in accordance with the second platoon formation.

6. The method of claim 5, wherein the object corresponds to an object that has a predetermined size and can move.

7. The method of claim 5, wherein the movement information of the object is shared among the vehicles included in the platoon through V2X (vehicle-to-everything) communication.

8. The method of claim 5, wherein the movement information of the object includes a position, a movement speed, acceleration of the object in each of sub-areas divided from an area around the third vehicle.

9. The method of claim 5, wherein the traveling in accordance with the second platoon formation includes approaching toward the sidewalk to maintain a block distance smaller than the width of the object with respect to the sidewalk in correspondence to the object block instruction message.

10. The method of claim 5, wherein the traveling in accordance with the second platoon formation includes:
    determining an extra gap from a forward vehicle positioned ahead of the second vehicle that is required for the second vehicle to approach within a block distance with respect to the sidewalk;
    traveling while maintaining a distance over the extra gap with respect to the forward vehicle;
    determining whether a collision with the object is expected, when the vehicle approaches within a block distance from the sidewalk;
    approaching within the spare gap toward the forward vehicle with the distance from the sidewalk maintained when a collision with the object is expected; and
    approaching within the block distance with respect to the sidewalk when a collision with the object is not expected.

11. The method of claim 10, wherein the determining of whether there is a possibility of a collision with the object include:
    determining a turning entry time required for the second vehicle to approach within the block distance with respect to the sidewalk;
    determining an expected position of the second vehicle after the turning entry time and an expected position of the object after the turning entry time; and
    determining whether there is a possibility of a collision on the basis of the expected position of the second vehicle and the expected position of the object.

12. A method of controlling a third vehicle that provides object sensing information to a first vehicle that transports passengers and a second vehicle that assists boarding/alighting of the passengers of the first vehicle in an autonomous driving system that controls platooning, the method comprising:
    receiving information about a first platoon formation of platoon vehicle traveling in a platoon in the same lane from the first vehicle;
    traveling in accordance with the first platoon formation;
    detecting an object moving adjacent to the lane;

transmitting movement information of the object to other vehicles included in the platoon;

receiving an object block instruction message, which changes the platoon formation into a second platoon formation such that a block distance between at least one vehicle included in the platoon and a sidewalk becomes smaller than a width of the object, from the first vehicle; and traveling in accordance with the second platoon formation.

13. The method of claim 12, wherein the object corresponds to an object that has a predetermined size and can move, the movement information of the object includes motion sensing information of the vehicle and image data of the object acquired by a camera of the vehicle, and the motion sensing information includes a position, a speed, and acceleration of the object.

14. The method of claim 12, wherein the movement information of the object is shared among the platoon vehicles through V2X (vehicle-to-everything) communication.

15. The method of claim 12, wherein the movement information of the object includes a position, a movement speed, acceleration of the object in each of sub-areas divided from an area around the third vehicle.

16. The method of claim 12, wherein the detecting of an object includes:

checking a sidewalk boundary of the a sidewalk adjacent to the lane;

checking a vehicle side boundary that is a side boundary of the vehicle; and checking the object moving between the sidewalk boundary and the vehicle side boundary.

17. The method of claim 12, wherein the detecting of an object includes:

acquiring an image including a forward vehicle positioned ahead of the third vehicle and a sidewalk adjacent to the lane;

checking a sidewalk boundary that is a boundary of the sidewalk adjacent to the lane in the image;

checking a vehicle boundary that is a boundary of the forward vehicle in the image; and detecting movement of the object between the vehicle boundary of the forward vehicle and the sidewalk boundary.

18. The method of claim 12, wherein the detecting of an object includes:

acquiring an image including at least one forward vehicle positioned ahead of the third vehicle of the platoon vehicles and a sidewalk adjacent to the lane;

checking a sidewalk boundary that is a boundary of the sidewalk adjacent to the lane in the image;

checking movement of the object between the sidewalk boundary and wheel boundaries that are boundaries of wheels of the at least one forward vehicle.

19. The method of claim 18, wherein the checking of movement of the object includes:

checking a start line horizontally extending from a bottom of a rear side of a first forward vehicle positioned right ahead of the third vehicle;

checking a start point where the start line and the sidewalk boundary meet;

checking at least one wheel boundary point where a line connecting wheel boundaries of at least one vehicle and the start line meet; and detecting the object existing between a wheel point, which is close to the start point of the at least one wheel boundary point, and the start point.

20. The method of claim 12, wherein the detecting of an object includes:

receiving a message including a position of the object from a rearward vehicle positioned behind the third vehicle in the platoon;

activating at least one sensor for sensing a surrounding area of the third vehicle in correspondence to reception of the message; and detecting the object moving in the surrounding area through the at least one sensor.

* * * * *